United States Patent
Sherman

[19]

[11] Patent Number: 6,141,765
[45] Date of Patent: Oct. 31, 2000

[54] LOW POWER, HIGH SPEED COMMUNICATIONS BUS

[75] Inventor: David L. Sherman, Fremont, Calif.

[73] Assignee: Gigabus, Inc., Fremont, Calif.

[21] Appl. No.: 09/080,671

[22] Filed: May 18, 1998

Related U.S. Application Data

[60] Provisional application No. 60/047,074, May 19, 1997.

[51] Int. Cl.[7] .................................................. G06F 13/42
[52] U.S. Cl. .............................................................. 713/400
[58] Field of Search ............................................. 713/400

[56] References Cited

U.S. PATENT DOCUMENTS

| | | | |
|---|---|---|---|
| 5,034,967 | 7/1991 | Cox et al. ................................. | 375/119 |
| 5,280,623 | 1/1994 | Sodos et al. ............................ | 395/325 |

*Primary Examiner*—John A. Follansbee
*Attorney, Agent, or Firm*—Gray, Cary Ware & Freidenrich

[57] ABSTRACT

A low power, high speed communications bus is provided which may interconnect semiconductor dies or computer modules over short distances. The bus may be operated in either a mesosynchronous mode of operation or asynchronous mode of operation so that the bus does not require a phase locked loop (PLL). In addition, the bus does not require termination due to the programmed 'series termination' in combination with strict limits on the time of flight on the bus versus the slew rate of the signals. The bus may also permit the port sizes connected to the bus to be reconfigured on the fly to provide "quality of service support for buses". The bus may also provide multiple independent data streams that may be controlled by a single address/command bus. The bus may also provide a pair of wires which carry two signals (e.g., a TStrb/Ren signal on one wire and a RStrb/Ten signal on the other wire) between each port to communicate the strobe signals between the ports.

18 Claims, 18 Drawing Sheets

LOW POWER, HIGH SPEED COMMUNICATIONS BUS

This application claims benefit of provisional application Ser. No. 60/047,074 filed May 19, 1997.

This invention relates generally to a system and method for communicating data between digital systems and components as in a microprocessor-based system and in particular to a system and method for high speed communication of data between closely spaced computer modules or semiconductor dies with low power consumption.

In a typical microprocessor-based system, information, address and control signals (hereinafter referred to as "data") is communicated between the various components, such as the microprocessor, a memory and other components, by a communications bus which interconnects the components. As the processing speed of the microprocessor increases exponentially, the communications speed of the bus must also increase to take advantage of the processing speed of the microprocessor. If the speed of the bus is not increased as quickly as the speed of the microprocessor, then the slower speed of the bus may prevent the microprocessor's speed from being fully utilized.

Since bus speed is determined by bandwidth of the bus and the latency of the bus, there is an ever increasing demand for an increased bandwidth (i.e., the amount of data capable of transfer during a particular time) and a decreased latency (i.e., the delay between when data is requested and when it is received). This is particularly true for communications channels between a memory and a processor or between several processors in a multi-processor configuration because of the large number of data transfers and the large amount of data being transferred. This demand has spawned the development of many new bus architectures and signaling conventions. For example, there are new standards for memory connections, such as SyncLink (adopted as IEEE standard 1596.7), and various de facto standards such as RAMBUS and the various synchronous DRAM specifications. These current bus architectures are being pushed to higher frequency operation in an attempt to catch up with the enormous data appetite of central processing units (CPUs) running at clock frequencies of more than 300 mhz. To achieve this, various incremental enhancements to the basic peripheral component interconnect (PCI) bus, such as AGP, have also been proposed, as well as enhancements to the main memory interfaces, to supply 3-D graphics applications with the bandwidth necessary to texture and generate geometric data that is required for the levels of interactivity now demanded by consumers. There are also numerous proprietary buses and interconnect methods for multi-processor servers and workstations. None of these conventional buses or systems provide an adequate solution to the increasing mismatch between the CPU's internal speed and the access speed of a memory, while maintaining a low power solution required for small form factor designs.

It is desirable to provide a short distance bus which may interconnect modules, such as semiconductor dies, in a computer system which has sufficient speed to match the speed of future microprocessors. For example, the high speed bus may interconnect several microprocessors with various memories in a multi-processor system. The die-to-die high speed bus must also dissipate a limited amount of heat due to the confined areas in which the bus may operate. As will now be described, none of the conventional buses provide a short distance high speed die-to-die interconnect bus.

In general, existing bus architectures consume very high power, are limited to point to point connections, are slowed down to provide generality or are designed strictly for use on a single semiconductor die. Currently existing bus architectures for use between packages add unwanted latency and unwanted power consumption by multiplexing the data and the address/control information down to very narrow electrical connections to save connectivity costs resulting from excessive number of pins. None of the existing bus architectures, as described below, is specifically targeted at very small form factors applications requiring very low power consumption.

Conventional prior bus architectures have generally fallen into several different categories based on the distances that data may be communicated. For example, a first category includes long distance backplane or motherboard style architectures (e.g., VME, PCI) that allow for the insertion and/or removal of add-on cards. The large form factor of the bus, the requirement that the bus provides the ability of a user upgrade, and that the bus allows multiple masters have all slowed down the speed of the bus and added to total power consumption of the bus. In addition, for this category of buses, the need to control the connectivity costs has led to solutions such as multiplexing the address and data signals onto a common set of wires which increases the power consumption of the bus.

A second category of conventional buses are short to medium haul (communications distance) buses and point to point buses, such as AGP 4X and Rambus. These buses are typically limited to a single master; the loading of the buses (i.e., the number of device connected to the bus) is limited; and the layout is constrained. These buses are still intended to have the data and address signals travel multiple wavelengths of the clock signal in terms of time of flight on the bus, hence these buses require terminations to avoid signal degradation and these terminations consume a lot of power. Therefore, the power consumption of these buses is significant which limits their applicability for any portable applications.

A third category of conventional buses are buses located on a semiconductor die (i.e., an on-die bus), such as the "AMBA" bus offered by ARM Ltd. These general purpose buses operate at low power levels by virtue of being on a single semiconductor die, but the speed of the bus is limited due to an adherence to a traditional synchronous signaling design and due to conventional address/target decoding once the bus is granted.

A fourth category of conventional buses are proprietary on-chip buses which are designed for a particular project so that there is no need for generality. These buses can therefore be as fast as the technology and the creativity of the bus designer allows. These buses, however, cannot be used for other applications. Therefore, this style of using proprietary buses is giving way to the idea of reuse of Intellectual Property (IP), and various standards for reuse of IP, such as that proposed by the VSI consortium or de facto standards licensed between companies, will become dominant within 5 years.

The conventional bus architecture approaches have limited applicability to use in modules containing multiple semiconductor die or in very short point-to-point connections where power dissipation is a critical design feature because of the difficulty of removing built up heat from a smaller space. In the future, power dissipation will become a larger issue as the frequency of operation (and thus the speed of the bus) goes up and the overall size of the modules goes down. In previous approaches, a system clock was required to be driven to all the devices on the bus, leading to constant power dissipation even when the bus was inactive.

In other attempts to address the problem of the mismatch between the internal speed of the CPU and access speed of a memory, there are proposals, such as PPRam, for embedding the memory into the same semiconductor die at the CPU to provide maximum access to the bandwidth available in the sense amplifiers of the dynamic random access memories (DRAMs). These solutions and even more exotic architectures which embed a 1-bit arithmetic logic unit (ALU) in the sense amp logic, give high theoretical peak performance and extremely high bandwidth access to memory, but require a high cost fabrication process, and sacrifice flexibility of programming and upgradeable design.

As advanced modules and chip scale technology migrates to mainstream use by the to engineering community, there is a need for a bus standard that is tailored to these advanced modules and chip scale technology. As companies move more towards reusable IP and multi-company projects, a standard bus architecture for modules and chip scale technology becomes even more desirable. In addition, companies are developing "system on a chip" designs that should have the same "mix and match" capability of a PCI bus and these designs will rapidly accelerate the acceptance of advanced modules which in turn makes a standard bus architecture tailored to these advanced modules even more desirable.

Thus, it is desirable to provide a communications bus architecture which meets the needs of inter-module communications and which avoid these and other problems of the prior art as described above, and it is to this end that the present invention is directed.

SUMMARY OF THE INVENTION

The solution to the problem of data communication between a CPU and a memory where the internal speed of the CPU is mismatched to the access speed of the memory is a high speed bus in accordance with the invention which is specifically designed to take advantage of various advanced packaging techniques. Although none of the conventional buses provide a solution for communicating over very short distances, the invention provides a bus tailored to work over the very short distances associated with multi-chip modules and which provides chip scale point-to-point connections. Due to the short distances of the data communications (e.g., about 1–5 cm), the high speed bus in accordance with the invention may have a high speed and a wide bandwidth to solve the current mismatch between the speed of the CPU and the access speed to the memory.

The invention provides a bus architecture for highly local interconnects by using a very efficient signaling convention that has the lowest energy expended per bit transmitted, the highest possible bandwidth and the lowest possible latency compared to existing high speed interconnect architectures. The invention solves the data access speed problems of the fastest processors and graphics engines for the foreseeable future. The bus, however, may also be applied to cost sensitive, high volume consumer products that require a small form factor and long battery life without sacrificing performance because the bus uses less power and consequently will extend the battery life and generate less heat than the conventional solutions.

The invention also provides a low power, short signaling distance communications bus which may be used to communicate data between, for example, semiconductor dies attached to a printed circuit board. The bus may provide asynchronous or mesochronous bus communications which reduces the overall power necessary for the bus since the clock signal is not transferred around the bus. In addition, the asynchronous communications protocol permits the latency of the bus to decrease because the speed of the retrieval of data is not limited by the clock speed and the timeslots assigned in a conventional bus. The bus also may operate without any terminations at the end of the bus, which is the theoretically minimum energy solution, since no low impedance paths from bus wires to power supplies exist, except the circuitry actively driving the bus to a level so that very little energy will be wasted.

The high speed bus in accordance with the invention may overcome the high power dissipation and added latency problems of other conventional bus solutions in a number of different ways. For example, dissimilar signal types are not multiplexed onto a common bus so there are fewer signal transitions required for a given transaction which leads to lower power dissipation by the bus. The signaling of the high speed bus is a combination of point to point connection for timing and strobing information with a conventional common address and data bus. This combination permits the benefits of a crossbar switch in terms of minimizing latency to signal a datum and interfering with other transactions while gaining the benefits of reducing the number of wires required by a large factor compared to a pure crossbar architecture with a given latency. In addition, a data transaction can be kept active on the bus while the bus is granted to another transaction without requiring a new request cycle from the initiator if the bus grant is lost, which can significantly improve the efficiency of the bus.

The high speed bus in accordance with the invention also removes the requirement of having a clock signal (Clk) running constantly to maintain a phase lock for the data transfer which reduces the total power consumption of the bus. This removal of the Clk signal is accomplished by using source synchronous strobe edges that travel with the data for latching at the destination. In addition, there is a synchronously stallable, asynchronously startable/stoppable clock generator that can provide clocking for the destination core if needed. Therefore, all of the bus activity is driven by data events and bus activity stops if there are no data events to cause bus activity, which reduces the power consumption of the bus. The high speed bus may, however, if the destination system requires a stable timebase, drive the Clk signal to provide that reference which will dictate the frequency of activity. This driving of the Clk signal will still, however, be initiated by a data event. Thus, there is no need for a phase locking circuit to be running constantly which reduces the power consumption of the bus. This driving of the Clk signal permits previously designed conventional synchronous cores to be used on the high speed bus which is asynchronous without adding any synchronizing latency. This driving of the Clk signal also permits use of asynchronous design techniques while facilitating testing of the device in a repeatable way with supplied test vectors.

In accordance with another aspect of the invention, the bus may have a separate wire connection for each master/slave pair connected to the high speed bus and a controller grants access to the bus to a component which requests the bus (e.g., the master). Due to the separate wire connection for each master/slave pair, the transaction may be stalled if the controller withdraws the grant of the bus to the master, and subsequently resumed without complicated protocols to accomplish this. Each master/slave pair acts as if it is connected over a private point to point connection while it has the bus grant, and de-granting merely inserts "wait" time into the transaction. Thus, the total power consumed by the bus is reduced. In addition, the latency of the bus is reduced because there is a direct point-to-point connection between each master/slave pair. The bus may have a cross-bar structure to grant multiple masters access to the bus, or be as simple as a single point to point connection with the same port logic in both cases.

In accordance with another aspect of the invention, the asynchronous communications protocol provides many advantages. For example, once a asynchronous request is made by a master component, the result of that request is event driven so that the total time necessary to access the data may be approximately less than 7 ns as opposed to 20 ns for a conventional 1998 technology bus. By completely eliminating the synchronizing check points imposed by a system clock, processing is free to proceed at the maximum speed. In accordance with another aspect of the invention, the data signals may be located near ground on the bus which reduces the overall power consumption of the bus. In addition, as the core supply voltage for a semiconductor device decreases with each next technology cycle, the data signals on the bus may continue to be used without modification even with new technology cycles. This provides significant advantages of manufacturing efficiency, since all parts of a system are not required to be of the same process generation in terms of the operating voltage to continue to operate with the high speed bus.

Thus, the high speed bus in accordance with the invention may provide low latency access, high bandwidth access, low power per access, small form factor and low granularity of memory increment. The bus may be used, for example, to provide CPU intermediate caches (e.g., L2 or L2+), a universal memory access (UMA) graphics memory, a high performance storage and connection system for routers or switches, an AGP texture buffer, a multi-processor shared memory for server class and super computer class machines, a high performance portable platform (e.g., mobile web browsers, personal web agents or smart telephones), a high performance main memory in an enhanced module or an intelligent random access memory (IRAM) module. The IRAM may be a memory centric module which may be connected to through standard expansion ports and may have one or more CPUs in the module.

In accordance with another aspect of the invention, the bus may be used to add functionality in a modular manner. For example, many processors need to have their floating point or graphics performance accelerated, but adding those features to the processor's semiconductor die may slow the processor clock speed by adding extra logic gates and multiplexing (mixing) logic in critical register and instruction decode paths. Further, many uses of central processing units (CPUs) do not require these additional acceleration features and using the inventive scheme, the base CPU semiconductor die can be less expensive since a user does not have to pay for unwanted logic. Instead, those features may be added as a separate module and connected to the processor using the bus in accordance with the invention which provides seamless integration with low latency and does not reduce the processor clock speed.

In summary, the high speed bus has various advantages which permit a high speed, low power bus to be provided. For example, the high speed bus does not require a phase locked loop (PLL) or a delay locked loop (DLL). In addition, the bus does not require termination due to the programmed 'series termination' in combination with strict limits on the time of flight on the bus versus the slew rate of the signals. The bus may also permit the port sizes connected to the bus to be reconfigured on the fly to provide "quality of service support for buses". The bus may also provide both mesochronous and asynchronous signaling over the same bus and multiple independent data streams may be controlled by a single address/command bus. The invention may also provide a pair of wires which carry two signals (e.g., a TStrb/Ren signal on one wire and a RStrb/Ten signal on the other wire) between each port to communicate the strobe signals between the ports. The high speed bus may also have pad drivers sized for driving the modules only.

The high speed bus may also absorb the controller functionality into the port pair logic in order to achieve theoretically minimum latency for transmission from a source to a destination on the bus. The high speed bus may also provide for the pre-granting of the bus with an asynchronous degranting of the bus. The high speed bus may also provide two phase asynchronous signaling with local feedback to produce send transitions faster than the loop time of the bus, while permitting a throttle event to occur without a guaranteed phase relationship. The high speed bus may also provide the ability to access all of the memory connected to the high speed bus from a subword of the data bus. The high speed bus may also use a ring oscillator as a signal frequency and phase adjuster. Finally, the high speed bus may provide uniquely low VDDQ signals for minimizing the total power dissipation on the bus.

In accordance with the invention, a high speed bus compatible memory device is also provided which may include a programmable number of banks as opposed to a conventional memory with a fixed number of banks. The memory connected to the high speed bus may include a refresh bit per row to minimize sleep power.

DETAILED DESCRIPTION OF A PREFERRED EMBODIMENT

The invention is particularly applicable to a module to module electrical bus and it is in this context that the invention will be described. It will be appreciated, however, that the high speed electrical bus in accordance with the invention has greater utility and is also well suited, for example, to point to point connections between packages. To illustrate the invention, several examples of systems which may use a high speed bus in accordance with the invention will now be described.

Figure 1:
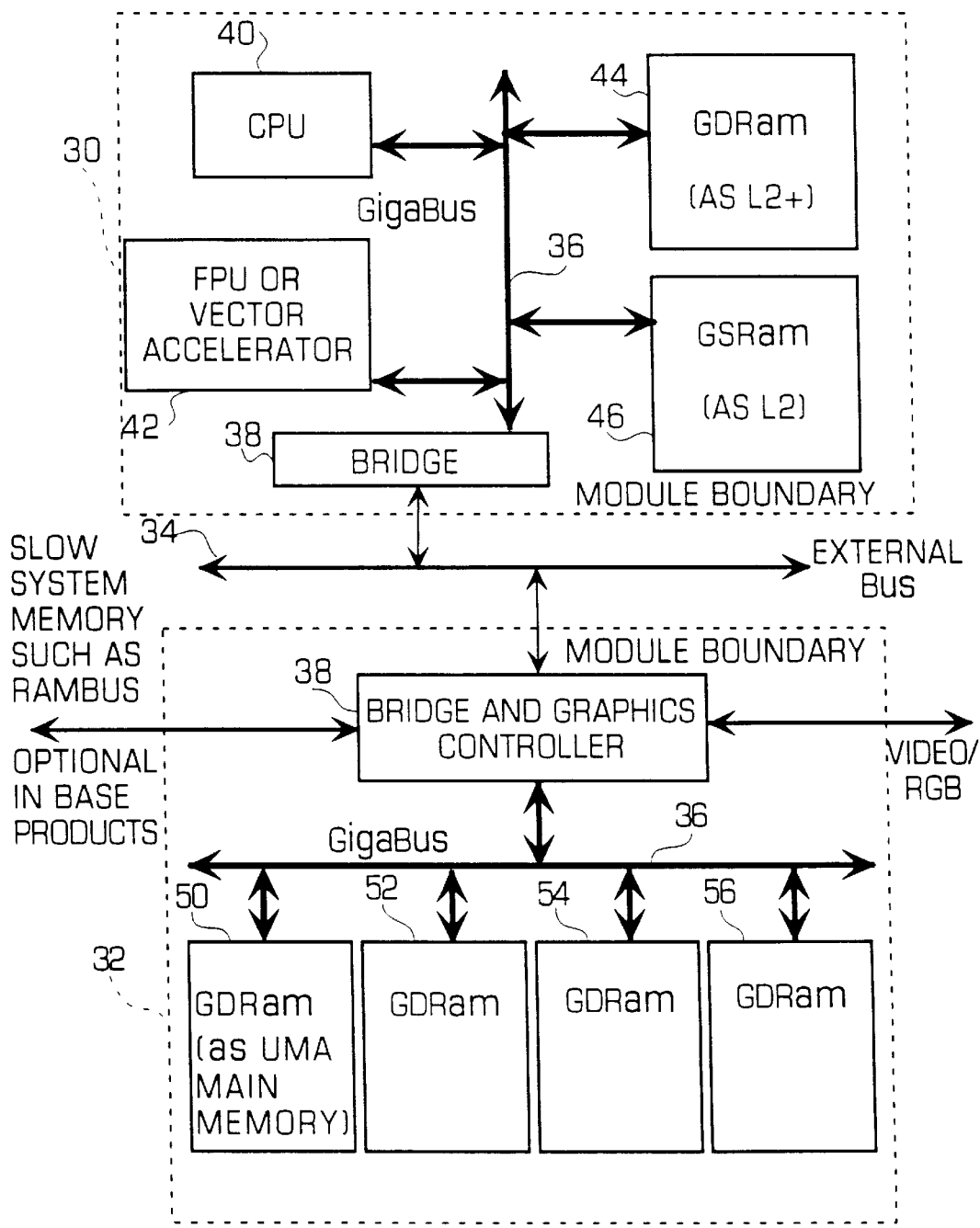
FIG. 1 is a block diagram of a two module computer system which may use a high speed bus in accordance with the invention.

FIG. 1 is a block diagram illustrating an example of a system that may use a high speed bus in accordance with the invention in several different manners. The system may include a first module 30 and a second module 32 that may be connected together to form, for example, a motherboard for a personal computer. As shown, the modules may be connected together by a conventional electrical bus 34, such as a Slot 1 or Socket 7 CPU bus. The various components within each module may be connected together by a high speed electrical bus 36 in accordance with the invention. A bridge 38 may connect the high speed bus 36 to either a conventional bus or a non-high speed bus compliant device or component. The bridge may convert the high speed bus signals into conventional bus or device signals and may also convert conventional bus or device signals into the high speed bus signals. Thus, the bridge provides the interface between the high speed bus 36 in accordance with the invention and conventional non-compliant components or other conventional buses. In some systems, such as mobile computer type systems, the high speed bus 36 may be the only bus in the system. Thus, the high speed bus 36 may be used in a variety of different systems.

In the example shown, the first module 30 may include a central processing unit (CPU) 40, a floating point unit (FPU) or vector accelerator 42, a level 2 cache memory 44 and a level 2+cache memory 46. As described above, these components are interconnected together by the high speed bus 36 in accordance with the invention. The functioning of the CPU or FPU will not be described since the operation of both are well known. The cache memories 44, 46 may operate in a conventional manner. The cache memory 44 may be a high speed bus compliant memory device with a conventional dynamic random access memory core (GDRAM) and the cache memory 46 may be a high speed bus compliant memory device with a conventional static random access memory core (GSRAM). Each of these memories is optimized to take advantage of the various advantages of the high speed bus 36 as described below.

The second module 32 may include the bridge 38 which may also function as a graphics controller for this module, a GDRAM 50 used as a UMA main memory, and one or more additional GDRAMs 52–56. In this module, the bridge 38 may also output video/RGB signals and be connected to other slower memory systems and buses such as a RAM-BUS. In operation, the second module 32 may store various video data generated by the CPU 40 in the GDRAMs 50–56 and output the video signals as required. The high speed bus 36 in the second module 32 may provide rapid access to the video data stored in the GDRAMs. In the first module 30, the high speed bus 36 may permit the CPU 40 or FPU 42 to communicate data to each other as well as rapidly access the cache memories 44, 46. Now, an overview of the advantages of the high speed bus 36 in accordance with the invention will be described.

The high speed bus 36 in accordance with the invention may provide numerous advantages. For a CPU or FPU, the high speed bus increases the data bandwidth between the CPU/FPU and memory and reduces the latency as compared to conventional buses. The high speed bus also eliminates the usual speed mismatch between the CPU or FPU core and the memory access speed so that the fall speed of the CPU or FPU may be fully utilized. In addition, due to an inventive signaling convention as described below, the high speed bus operates at low power levels and therefore low power dissipation levels which makes the high speed bus ideal for module to module or inter-module or die to die connections in which the high speed bus may be packaged into a sealed package.

The high speed bus may also permit a manufacturer to add functionality into a system in a modular manner. For example, many CPUs need to accelerate the floating point operations and graphics operations to be competitive, but adding the floating point functionality into the semiconductor die of the CPU may unnecessarily slow down the CPU's clock speed. To solve this dilemma, the functionality may be added as a separate module or semiconductor die and then connected to the CPU by the high speed bus 36. For example, as shown in FIG. 1, the FPU 42 may be added to the CPU 40 without having the FPU 42 on the same semiconductor die as the CPU 40. The CPU and FPU may then be connected together by the high speed bus 36 in accordance with the invention. Due to the high speed of the bus 36, there is little performance degradation due to the physical separation of the CPU and the FPU, and performance will be enhanced in properly designed systems where the CPU and FPU are capable of running in parallel.

The high speed bus 36 may also permit data to be communicated between the various components or dies connected to the high speed bus 36 in an asynchronous or mesochronous manner, as described below. In accordance with the invention, both the asynchronous or mesochronous communications protocols do not require a continuously running clock signal to be routed to all of the device or components connected to the bus which reduces the power consumed by the bus. In addition, the asynchronous or mesochronous communications also permits data to be communicated more rapidly between the components since the transfer of the data over the high speed bus is not dependent on the clock signals. The high speed bus 36 may also connect each module or component which usually requests data (e.g., a master) to each other module or component which usually stores and provides data (e.g., a slave) by a unique wire pair such that each master/slave pair has its own timing and throttling communications path between each other. The details of the unique wire pair between each master/slave pair will be described in more detail below. Due to the direct point-to-point contact between each master/slave pair, a master may be granted access to the bus at a particular time, but may continue to keep the communication path between the master and slave open for quick resumption of transmission even when the access to the bus has been withdrawn. This provides the minimum latency and ease of design for the master and target devices, since there is no contention for the timing resource which can cause the problem of metastability.

To better the subsequent description of the figures and the invention, various signals, signaling conventions and naming conventions in the high speed bus will now be briefly described. These signals are further described in U.S. application Ser. No. 60/047,074, filed May 19, 1997 which is incorporated herein by reference. The term "central resource" describes a logically distinct machine and may be physically part of the application specific integrated circuit (ASIC) containing a port of the high speed bus. The term "port" describes a logical source or destination for data connected to the high speed bus. Each port connected to the high speed bus may have a set of unique signals at the physical level so that each port may request and be granted control of the high speed bus, as described below. Due to the high speed of the bus, conventional buses in which a target may decode an address to determine if it is being addressed, the high speed bus provides separate control signals (TStrb/Ren, RStrb/Ten) as described below for each port. This is the minimum latency scheme, since no extra delays are required for transmission of data on the bus once it is granted.

The high speed bus may provide a clock signal (Clk) which provides a stable frequency timing reference for any modules or ports connected to the high speed bus. A Clk signal may be generated by the central resource to support mesochronous bus operation. The high speed bus may operate either in a "mesochronous" signaling mode or in a "asynchronous" signaling mode. For both of the modes, data transactions on the high speed bus are not referenced to the edges of the clock signal so that the high speed bus does not operate in a synchronous mode of operation. Therefore, for any data transaction, each port connected to the high speed bus provides its own transmit/receive clock pair (TStrb/Ren, RStrb/Ten) as described below. The Clk signal is therefore provided for ports connected to the high speed bus using mesochronous signaling or for ports which cannot generate their own internal clock signal. In accordance with the invention, a port connected to the high speed bus may use the Clk signal as a root clock signal for purposes of driving the internal clocks in the port with a stable frequency.

For the mesochronous signaling, the frequency of the Clk signal may range from RefRate to 300 Mhz, although the invention is not limited to a particular top speed. The RefRate is the system selectable refresh rate for a dynamic random access memory (DRAM) core that does not contain self refresh circuitry, such that the DRAM core does not lose data. When the high speed bus is in a sleep mode in which it is acceptable for the DRAM to lose data or if the DRAMs contain self refresh circuitry, the Clk frequency may be zero. The Clk may be frequency throttled for power conservation. For the mesochronous signaling, the Clk signal may be used to provide a stable frequency for the TStrb signal for each port so that the local clock for all of the ports are running at the same phase shifted frequency. This mesochronous mode provides the ability to control the frequency of operation, which is especially useful when testing a device during production. This capability to test asynchronously operated circuitry mesochronously with a stable frequency, is a unique feature of the invention.

In the asynchronous signaling mode, the two ports which are going to communicate with each other are assumed to have different TStrb periods and therefore this mode of operation ignores the Clk signal completely and the connected ports negotiate the TStrb phase length during a "training period" which occurs immediately after powering up the system, and then periodically in a system dependent manner. In the asynchronous mode, very fast CPUs which clock speeds higher than or equal to the Clk signal speed may drive data onto the bus without regard for the Clk signal's phase or frequency. This mode of signaling permits very fast bus operation with minimal power consumption since the clock does not always need to be running at the maximum frequency. In addition, for devices which both have internal clocks, no Clk signal is necessary and the high speed bus may accommodate devices having different maximum internal clock speeds.

Each port connected to the high speed bus may be provided with a VRef signal which is a stable reference voltage to which the other signals in the high speed bus are referenced. In accordance with the invention, the high speed bus may use low voltage swing signals (e.g., from 0.6 V to 1.65 V peak-to-peak). A VDDA signal is a positive power supply for the high speed bus devices, and VSSA is an analog ground. These power supplies are distinct form any core supplies. A GimSel signal indicates which Port is being addressed when the TStrb/Ren signal is connected to more than one target port. In accordance with the invention, all clocking and active power dissipation in a port is disabled when the GimSel signal is low and the input sense amps may be enabled when the GimSel signal is asserted. Now, the various data clocks and strobes in accordance with the invention will be described.

A TStrb/Ren signal may provide timing reference for a module connected to the high speed bus to transmit data or an enable to receive data. The TStrb/Ren signal may be driven from a data source connected to the high speed bus into the data destination. Each separate port on the high speed bus may have a separate TStrb signal. The separate TStrb signal reduces design complexity and accommodates any potential clock skew due to the distribution of a clock signal. The TStrb signal may be transmitted with the data packet and then the destination may latch the received data on the edge of the received TStrb signal which eliminates the need for PLLs. If a port is being enabled to receive data, then this output signal may be "Ren" indicating that the port is ready to receive data. The port asserting the Ren signal may deassert it when its buffer is "almost" fall and the data source must wait for the Ren signal to be reasserted before transmitting more data. For any given port, TStrb/Ren of the data source is connected to the RStrb/Ten of the data receiver which forms an efficient handshake loop in terms of both latency and energy per bit transmitted. Similarly, the RStrb/Ten input signal provides timing reference for a module to receive data (RStrb) or an enable to transmit data (Ten). When this module is receiving data, this is the input data clock and is operated connected to a companion TStrb/Ren signal. With the Ten signal, when this module is sending data this signal is asserted by the module receiving data (the receiving modules "Ren") until the module cannot accept data. So Ten is an input signal that it is OK to send more data, in this context.

The operation of the high speed bus in terms of the protocol is identical for both mesochronous and asynchronous communications operation, and both modes can co-exist on the same bus at the same time for different ports. This is a unique feature of the GigaBus protocol. The only difference is that the mesochronous rate of transmission is confined to the Clk frequency. Now, an example of a multi-processor system that may use a high speed bus in accordance with the invention will be described.

Figure 2:
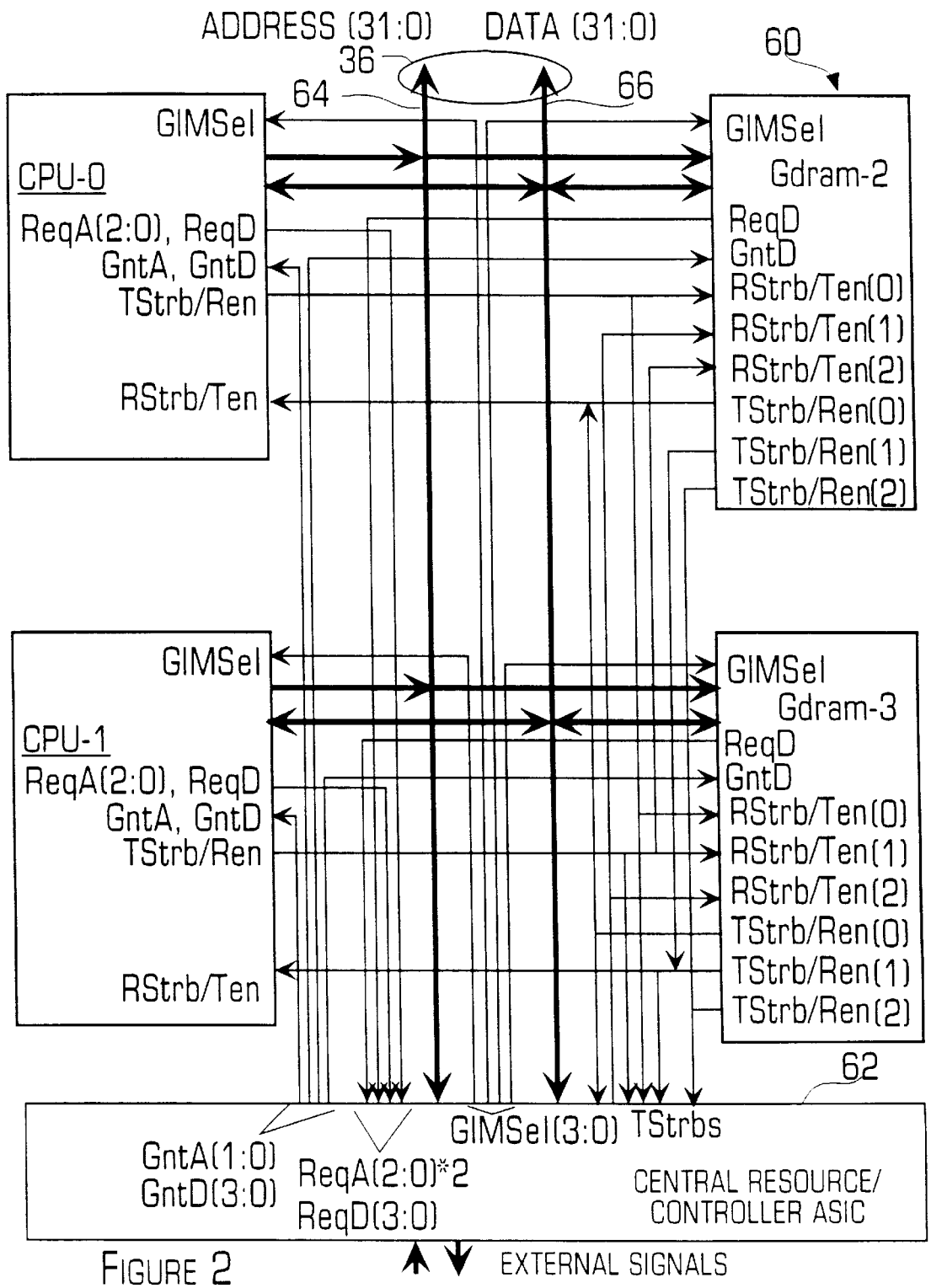
FIG. 2 is a block diagram of a multiprocessor system which may use the high speed bus in accordance with the invention.

FIG. 2 is a block diagram of a multi-processor system 60 that may use a high speed bus 36 in accordance with the invention to route data between a first central processing unit (CPU-0), a second CPU (CPU-1), a first high speed bus compatible dynamic random access memory (Gdram-2), a second high speed bus compatible dynamic random access memory (Gdram-3), and a central resource/controller application specific integrated circuit (ASIC) 62. In general the central resource/controller 62 may control access to the high speed bus 36 as described below.

Each CPU (CPU-0, CPU-1) may generate an address bus grant request signal (ReqA) and a data bus grant request signal (ReqD) for requesting access either to the address bus or the data bus of the high speed bus 36 in order to send an address to a memory or request to send data to a memory or the Central Resource/Controller. Each memory (Gdram-2, Gdram-3) may generate a data bus grant request signal (ReqD) when the particular memory would like to be granted access to the data bus in order to communicate data to one of the CPUs. In response to the above request signals, the controller 62 may output a grant address bus access signal (GntA) and a grant data bus access signal (GntD) in order to control the access of the CPUs and the memories to the high speed bus. As shown, the GntA signals are communicated to the CPUs since the CPUs need to obtain access to the address bus in order to send addresses to the memories. The memories (Gdram-2 and Gdram-3) may receive the GntD signal when the particular memory has been granted access to communicate data over the high speed bus. In response to a request for access to the data or address bus, the controller 62 may also generate a GIM select signal (GimSel) which activates the particular chip or module which has been granted access to the high speed bus. In accordance with the invention, for integrated circuits (ICs) that have a bus which is wider than 32 bits, the IC may be logically broken down into multiple high speed bus interface R modules (GIMs) in which each GIM has a 32-bit wide data bus. The IC will also have multiple GIMSels signals per IC to control each GIM. For example, an IC with a 64-bit wide data bus may be logically broken down into 2 GIMs and be controlled by two GIMSel signals (one for each GIM).

In this example, the high speed bus 36 may include a 32-bit wide address bus 64 and a 32-bit wide data bus 66 which are connected to each of the CPUs and each of the memories. As shown, the address bus 64 may communicate address signals from the CPUs to the memories while the data bus 66 may be bidirectional. The controller 62 may also receive a transmission clock signal (TStrb) from each device connected to the high speed bus to determine when the high speed bus is being accessed. In the example shown, an individual TStrb signal may be shared by more than one device (e.g., the Gdram-2 and Gdram-3) connected to the high speed bus and the access to the high speed bus is controlled using the GimSel signal described above. Thus, in this example, the number of TStrb signals is not equal to the number of devices to the high speed bus. However, in accordance with the invention, each device connected to the high speed bus may generate several of its own TStrb signals so that the number of TStrb signals received by the controller 62 is not necessarily equal to the number of devices connected to the high speed bus.

Now, additional details of the ReqA, ReqD, GntA and GntD signals are described. Only ReqA signal is active for read transaction requests, while both ReqA and ReqD may be active for a write transaction which guarantees that read commands on the address/command bus may be issued while the data bus is busy with transmitting data from another previous request. For reads returned out of order, the port returning the data must issue a ReqA signal to obtain access to the address bus in order to return the address for the returned data. It should also be noted that the recipient of out of order data must know that the sending port may return data out of order and must sample the address bus even for reads.

The ReqD signal requests access to the data bus bit fields associated with a particular port. These requests may be serviced using a round robin algorithm, or any other fair arbitration. The GntA signal indicated that the central resource has granted the port access to the address bus and the grant may be deasserted for one source and granted to another source one Central Resource TStrb signal phase later if the transaction finished successfully. If the transaction is being interrupted, the grant can only be asserted for the interrupting transaction after the requesting port has signaled it relinquished control by pulsing it's Req(A or D) low before reasserting it again one TStrb phase later. In fact, another port may receive an address bus grant while a data transaction continues. The GntD signal indicates that the central resource grants access to the data bus bit fields associated with the port and the grant may be deasserted for one source and granted to another one TStrb phase later. If the two ports utilize different bit fields of the data bus, then both ports may be granted access to the data bus, as described below. Now, an example of a high speed router which may use a high speed bus in accordance with the invention will be described.

Figure 3:
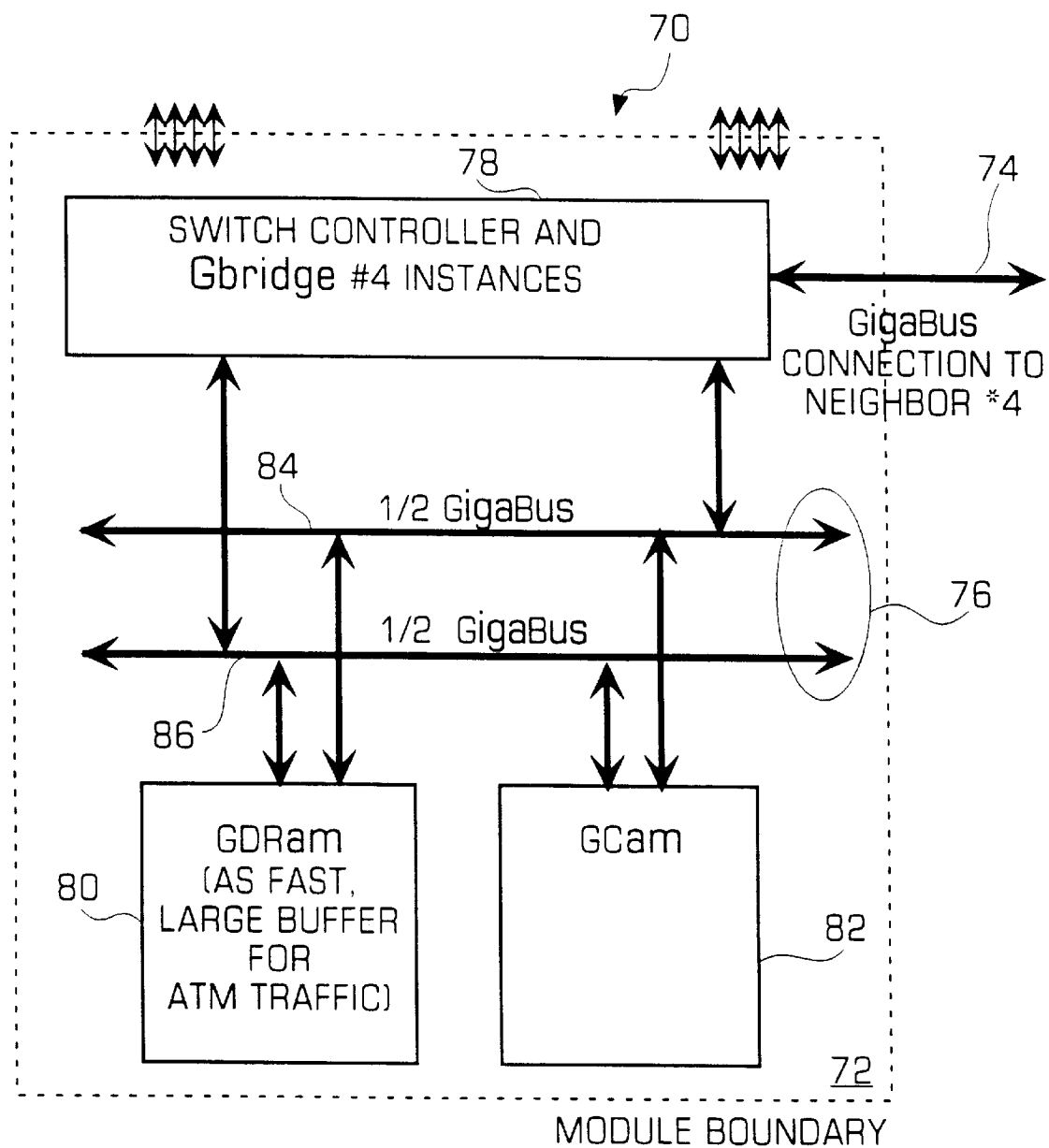
FIG. 3 is a block diagram of a high speed router which may include the high speed bus in accordance with the invention.

FIG. 3 is a block diagram illustrating a high speed router 70 which may use the high speed bus 36 in accordance with the invention. Although not shown, the high speed router 70 may actually include up to four modules 72 connected together by a first high speed bus 74 and the components in each module may be connected together by a second high speed bus 76. Thus, the router may have eight serial data links connected to each module for a total of thirty-two serial data links connected to the router. As an example, each serial link may be operating at a speed of 1 Gb/sec. The addition of the high speed bus in accordance with the invention into the router 70 gives a general means to interconnect serial link data streams, with less cost than a pure cross bar structure and at the same time allows a commodity density DRAM memory to be used to buffer bit streams so that no data packets need be dropped due to temporary congestion in the switch. The configuration of the high speed bus as 2 independent data sub-buses allows easier simultaneous temporary storage of packets on one data sub-bus and retrieval of previous packets on the other data sub-bus. For the purposes of the remainder of this discussion about FIG. 3, a single module 72 as shown will be described, but each module in the router has a similar architecture and operates in a similar manner.

Each module 72 in the router 70 may include a switch controller and Gbridge circuit 78, a high speed bus compatible dynamic random access memory (Gdram) 80 as described above, and a high speed bus compatible contents addressable memory (Gcam) 82. The switch controller and 78 may control the transfer of data or addresses between the high speed buses 74 which interconnect the modules 72 in the router. The switch controller and Gbridge may also control the processing of data packets entering and exiting the router as is well known. In this example, the second high speed bus 76 may be logically divided into two separate buses 84, 86 in order to provide two separate data and address paths to the GDRam 80 and the Gcam 82. In the router, the GDRam may serve as a fast access, large size data packet buffer for asynchronous transfer mode (ATM) data packets, for example. Thus, due to the two access paths to the GDRam and the Gcam, and the overall speed of the high speed buses, the internal operating speed of the router is increased. Now, an example of a level 2 plus (L2+) cache memory that may use the high speed bus in accordance with the invention will be described.

Figure 4:
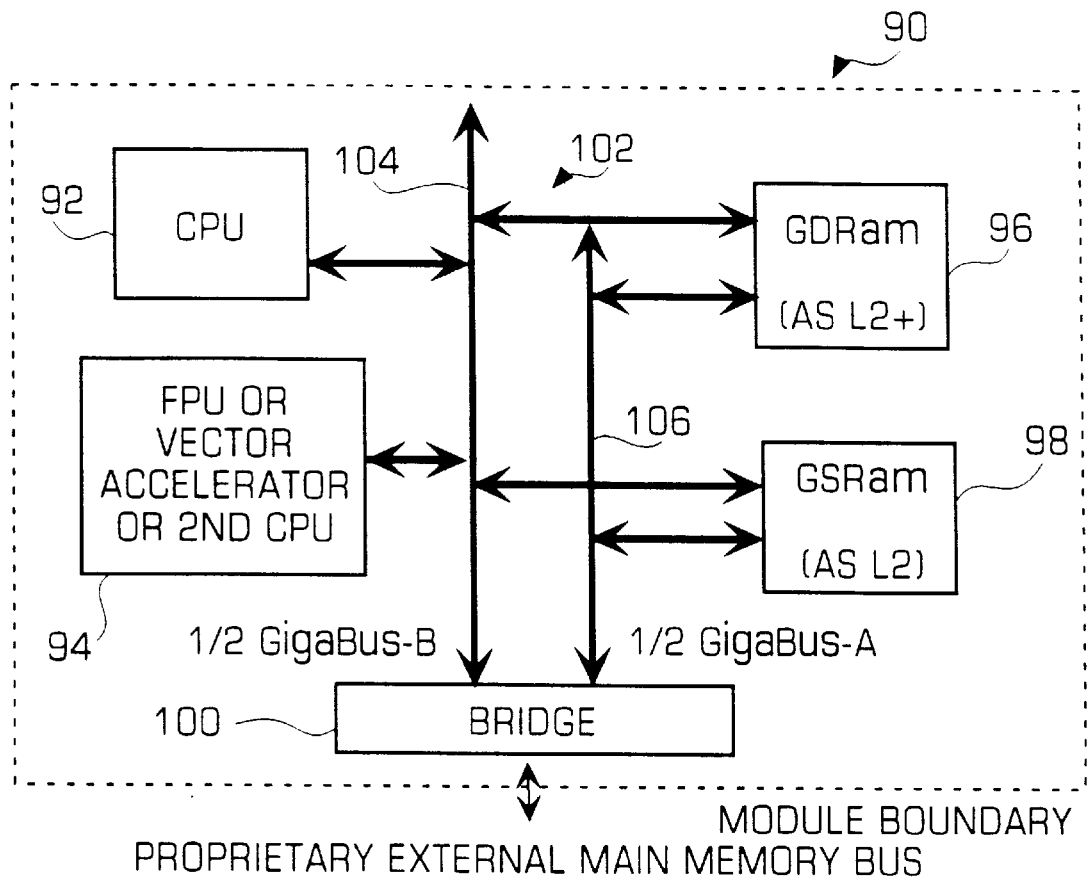
FIG. 4 is a block diagram of a computer module in which the cache memory of the module is implemented using the high speed bus in accordance with the invention.

FIG. 4 is a block diagram of a computer module 90 which includes a level 2 plus (L2+) cache memory which has been implemented using a high speed bus in accordance with the invention. As shown, the computer system 90 may include a central processing unit (CPU) 92, a floating point unit (FPU)/vector accelerator or a second CPU 94, a GDRam 96, a GSRam 98, and a bridge 100. The various components of the computer module 90 may be connected to each other by a high speed bus 102 in accordance with the invention. The CPU and/or FPU execute instructions and process data within the computer module and may request and receive data from the GDRam 96 which may function as a level 2 plus fast cache memory and from the GSRam 98 which may function as a level 2 cache memory. In this example, the high speed bus 102 may be logically divided, as described below, into two separate buses 104, 106. The first bus 104 may be connected to the CPUs and FPU and the memories to permit the CPU or FPU to request data from either of the cache memories. The second bus 106 permits the cache memories 96, 98 to transfer data between themselves efficiently and in parallel with the requesting and transfer of data between the memories and the processing units 92, 94. Both of the buses 104, 106 may be connected to the bridge 100 which interfaces the high speed bus 102 to, for example, a main memory bus. The bridge may convert the high speed bus data into a format compatible with the main memory bus and also convert the main memory bus data into a format compatible with the high speed bus.

In the configuration shown, the bridge 100 may burst data into the GDRam 96 and the GSRam 98 through the 128 bits of the logical bus 106 at the main memory rate while the CPUs 92, 94 may simultaneously access data from the GDRam or the GSRam over the second bus 104 at a speed of up to 8 Gbytes per second. Thus, the filling of the cache memories with data does not interrupt or slow down the speed with which the CPUs may access data in the cache memories. The CPUs also have a direct path to the external bus if necessary through the first bus 104. The bridge 100 may also copy new data fetched by the CPUs into the GDRam or GSRam as it is being fetched for the CPUs to increase the speed with which frequently used data is loaded into the cache memories. Thus, the high speed bus in accordance with the invention may increase the overall speed of the cache memories and reduce the chances of cache miss event. In accordance with the invention, additional GDRams and GSRams may be utilized to provide additional cache memory space. Now, an example of the high speed bus being used as a backplane will be described.

Figure 5:
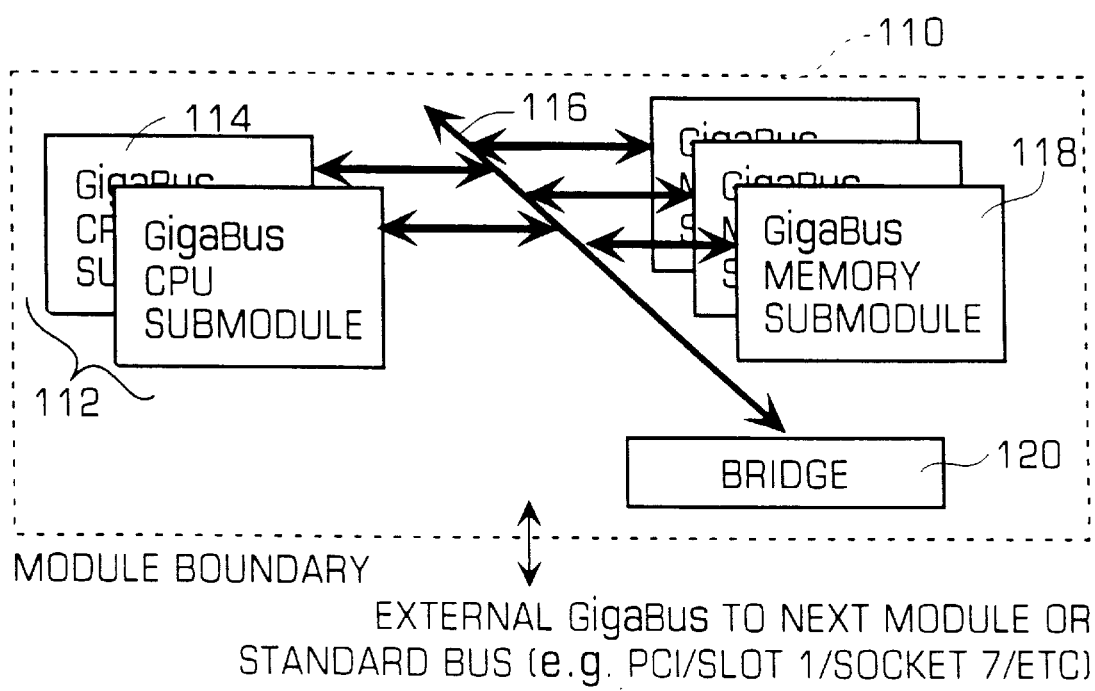
FIG. 5 is a block diagram of a computer module in which a backplane bus may be implemented using the high speed bus in accordance with the invention.

FIG. 5 is a block diagram of a computer module 110 that may use a high speed bus in accordance with the invention to form a backplane of the computer module. As shown, the module 110 may include one or more high speed bus CPU submodules 112. Each submodule 114 may be interconnected together using a high speed bus 116. The high speed bus 116 may also connect the submodules to a memory submodule 118 and to a bridge 120. The bridge 120 may permit the high speed bus 116 to communicate data with a conventional main memory bus, for example. As shown, the high speed bus operates as a high speed backplane bus interconnecting one or more submodules 112. Each submodule 114 may include an internal high speed bus in accordance with the invention which is connected to a bridge so that each submodule may communicate data over the backplane bus to another submodule or to, for example, an external main memory bus by the bridge 120. In all of these examples of applications for the high speed bus in accordance with the invention, the high speed bus provides many advantages to conventional systems, such as a cache memory system, a router or a backplane since the high speed bus, among other things, operates a faster data transfer rate than conventional buses. The high speed bus also provides for the logical division of the high speed bus into two or more separate logical buses so that multiple data transactions may occur simultaneously which increases the overall speed of the system into which the high speed bus is incorporated. Now, the architecture of the high speed bus in accordance with the invention will be described.

Figure 6:
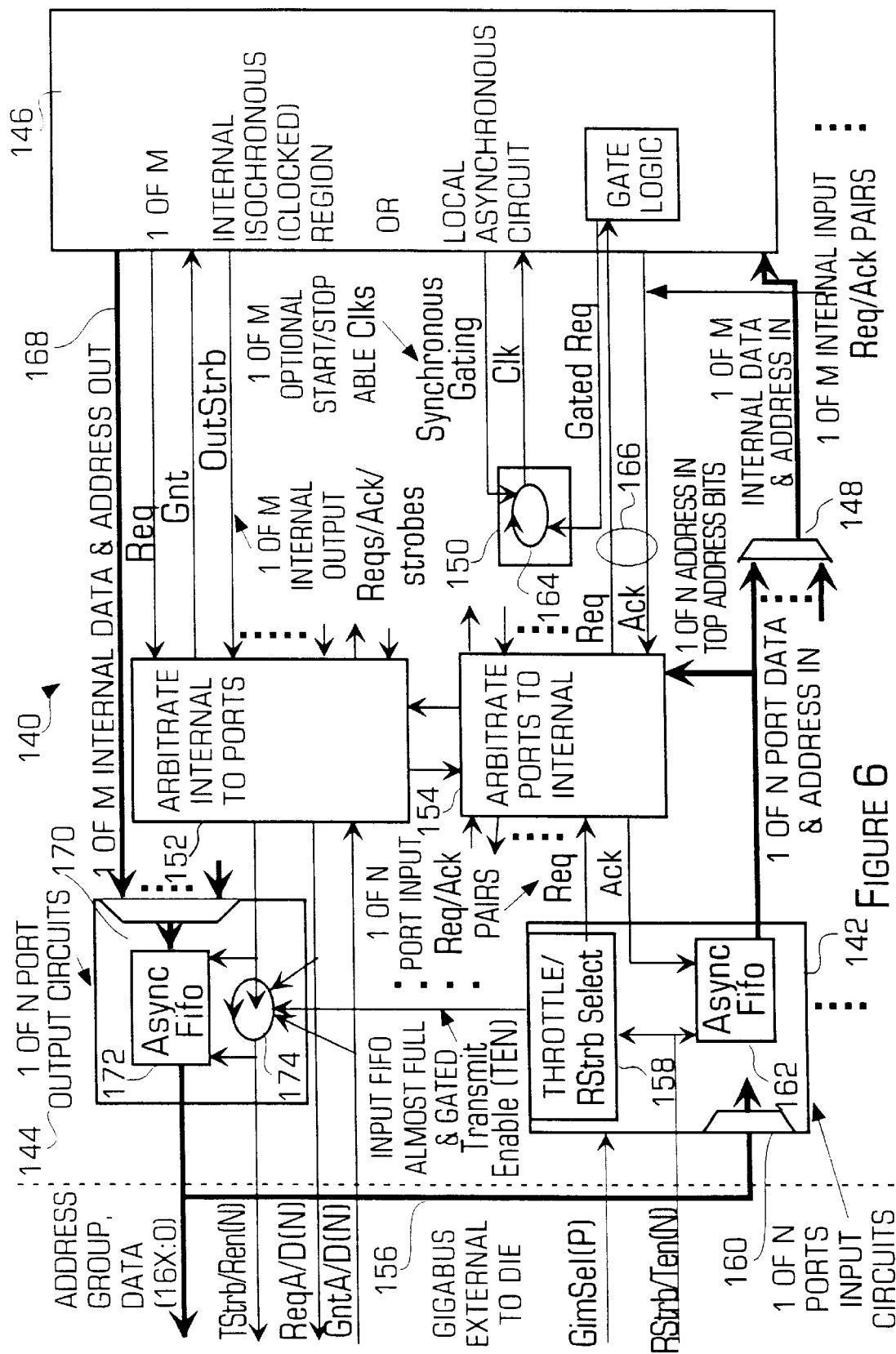
FIG. 6 is a block diagram of a high speed bus controller in accordance with the invention.

FIG. 6 is a block diagram illustrating an embodiment of a high speed bus controller/interface 140 in accordance with the invention. The communications path of data and addresses between a plurality of ports (1–N) to the Data and Address bus of the invention and a plurality of Internal Regions of an Integrated Circuit die (1–M) will be described.

The controller 140 may include, for each high speed bus port (1–N), a port input circuit 142 and a port output circuit 144. It will be noted that portions of the controller are symmetrical in that the data and addresses is processed by similar means in both the ingress and egress directions. The controller may be connected to a plurality of internal isosynchronous (clocked) regions or local asynchronous circuits or devices (1–M). For illustration purposes, only a single internal isosynchronous (clocked) region or local asynchronous circuit or device 146 is shown. An internal region may be, for example, a GDRam core or a bank of a GDRam core into which data may be stored and retrieved.

The controller may farther include a multiplexer 148, a synchronous clock generator 150, an arbitrate internal to ports circuit 152, and an arbitrate ports to internal circuit 154. The actual M*N crossbar topology is illustrated further in FIGS. 9A and 9B which further illustrate the arbitration circuit connection. The controller acts to process requests for access to the bus by the internal regions, grants access to the bus as needed, and controls the transfer of data and addresses between the high speed bus ports and the internal regions. The port input circuit 142 may receive a GimSel signal, an RStrb/Ten signal, and the address/data bus of the external high speed bus. The port input circuit may include a Throttle/RStrb Selector 158, a multiplexer 160 and an asynchronous first in first out (FIFO) buffer 162. The GimSel signal, when high, may select the particular port input circuit 142 for receiving a command targeted at a particular internal region 146 The high speed bus address group and data are strobed into the input latch and multiplexing section 160 by the RStrb/Ten signal rising edge. Each of the N high speed bus input ports can be 32 to 256 bits wide, in increments of 32 bits. Each 32 bit port increment (referred to as a GIM or high speed bus interface module) can further be configured to accept data from only 16 bits of it's data fields and send the received 16 bit datum to the appropriate memory address. Thus, each 16 bit sub-field of the entire high speed bus data bus can access the entire memory address space behind a port. The asynchronous FIFO 162 may permit the high speed bus to send data to a port even when the port does not have access to the addressed internal region, as described below, so that asynchronous communication of the data between the port and the internal region may occur.

When the particular input port has been granted access to the bus, as described below, the data may flow through the asynchronous FIFO 162 to the multiplexer 148 which may multiplex the incoming port address and data from 1 of N ports onto the bus connected to one of the M internal regions. In the example shown, the multiplexer is outputting a signal to the internal region 146 shown. Returning to the port input circuit, the RStrb/Ten signal is fed into the selector 158 and the asynchronous FIFO 162. The RStrb/Ten signal may control the flow of data into the asynchronous FIFO 162 during write operations, by strobing a new data packet from the high speed bus on each edge (whether positive or negative going) of RStrb/Ten.

The arbitration of access to and from the bus is controlled, in the ingress direction, by the arbitrate ports to internal circuit 154 and in the egress direction, by the arbitrate internal to ports circuit 152. Therefore, the selector 158 in the port input circuit 142 outputs a request (Req) signal to the arbitrate circuit 154 to request access to an internal region by the particular port. If the particular port is granted access to the Internal Region, the arbitrate circuit 154 passes the Req signal from 158 through to the selected Internal Region. When the Internal Region accepts the Address/Data/Command, it generates an acknowledgment signal (Ack) which is fed back to the asynchronous FIFO 162 through the Arbitrate block 154 to control the asynchronous FIFO as described below. The arbitrate circuit 154 may also be connected to each of the other port input circuits which are not shown (for clarity in the drawing) in order to arbitrate access to 1 of M Regions by all of the 1 of N ports. The synchronous clock generator 150 may include a ring oscillator 164 and is used to optionally generate a Clock signal for use by Internal Regions that are synchronously designed instead of purely 4-phase asynchronous in operation. The ring oscillator 164, based on a Synchronous Gate signal and the Pulse Continue signal from the internal region 146 may generate a clock signal (Clk) which is used as the clock by the internal region 146. In usual practice, the Internal Region will simply pass a gated and latched version of the original Req signal back to the ring oscillator 164 to initiate generation of it's own clock based on an event (e.g., the Req activity). Because there are 1–M internal regions, there are 1 M pairs of Req/Ack signal pairs so that each internal region 146 has its own separate Req/Ack pair. It is important to note that if 32-bit port circuits are ganged together into larger ports, the Req signals from the individual input circuits 158 for each 32-bit Port circuit will be combined with a Muller-C element (described below) in the input arbitrator 154 into a composite Req signal which is presented to the Internal Region. The input arbitrator 154 and the output arbitrator 152 may communicate data with each other, such as which of the ports that have been granted access to the bus. Now, the output path of data from an internal region 146 to the external bus will be described.

When an internal region generates data or an address, the data or address is fed out over an internal data/address out bus 168 to the port output circuit 144. The port output circuit 144 may include a multiplexer 170 to select 1 of M Internal Regions, an asynchronous FIFO buffer 172, and a ring oscillator 174. The data or the address from one of the internal regions 146 enters the multiplexer 170 and is fed into the asynchronous FIFO 172. The arbitration for the output bus is controlled by the output arbitrator 152 which operates in a similar manner to the input arbitrator 154. The ring oscillator may be used to control the asynchronous FIFO 172 and may also generate the TStrb/Ren signal which is output by the controller to the external bus. The asynchronous FIFO 172 may output the data or address over the data/address bus 156. As with the ingress portion, the asynchronous FIFO permits the internal region to continue sending data, corresponding to the size of the asynchronous FIFO, when the internal region has lost access to the bus. Thus, even if the internal region loses the access to the bus, it may continue to send data or address information until the Asynchronous FIFO indicates that it is "full". To further help explain the controller 140 in accordance with the invention, an example of the flow of information when the external bus is reading data from the internal circuit/region will now be described.

The flow of data and process by which the external bus reads data or an address from the internal region/circuit begins as GimSel signal goes active, if it isn't already active. The GimSel signal enables the Input circuitry 142 to read data or addresses from the bus 156. Simultaneously, the source that is driving the bus (not shown) is given the Address grant, and drives the address/control data onto the bus, followed by it's TStrb/Ren signal which is coupled with the RStrb/Ten signal shown in FIG. 6, and latches the Address and Control data into the asynchronous FIFO 162. The External Data bus 156 is unaffected by this operation, and may be continuing to transfer data between 2 other ports that have already started a transaction.

The upper portion of the Address bits and the Control information are extracted from the asynchronous FIFO 162 and sent to the input arbiter 154 (the "Arbitrate ports to Internal" block) to select the appropriate destination internal region or circuit for the read command. The input arbiter is necessary because the destination internal circuit may already be accessed by another port so the arbiter must resolve any access conflicts. Assuming there is no other port already accessing the destination Internal Region, the address is selected by the input multiplexer 148, and a Req signal is passed to the appropriate region/circuit. The Internal Region 146 sends an acknowledgment signal (Ack) indicating receipt of the address/command data. The Ack signal is fed back to the asynchronous FIFO 162 through the input arbiter 154, and the next piece of data (entry) is enabled (if a new entry is active). This chain of Req/Ack signals from Asynchronous Input FIFO logic 158,162 through the arbiter logic 154 to a selected Internal Region 146 follows a traditional 4 phase asynchronous signaling protocol, which is well known to be highly insensitive to signal delays, and therefore forms a highly reliable, metastable free method for communicating between the high speed bus and an interior region. Conventional systems used this signaling method to provide synchronization on the bus, however that is inferior since signaling delays are not as controlled, and loop time issues with 4-phase signaling will potentially be severe. This method contains the loop time to a very constrained region on the die, which will not limit the speed of the system bus, and in conjunction with the Asynchronous input FIFO, will not require stalling any clocks or strobes on either the high speed bus or in an Internal Region.

As the data read is happening, the output arbiter 152 (i.e., the "Arbitrate Internal to Ports" block) selects the addressed Internal region Internal data bus for output through the Output Port Asynchronous FIFO 172, and issues a ReqD signal to acquire control of the data bus subfield that the output Port is configured to use for the transfer. The ReqD signal may be delayed for accesses which require a longer period of time before transfer of the data so that the bus is not prematurely granted to this port which locks other requesters off the bus needlessly. Alternately, the ReqD signal may be delayed by some other access through the same port from a different Internal Region, but in that case the ReqD signal is already asserted by the other transaction happening through that port.

When the data bus is free, it is granted to the requesting port, which enables the ring oscillator 174 to be triggered by the arrival of the arbitrated InternalStrb signal, which will usually be a Source synchronous clock traveling in "a wave" with the data, similar to the TStrb/RStrb pair. Since the high speed bus architecture (GigaBus™) calls for return by request at all levels of the hierarchy, this clock will be of arbitrary phase and period, depending on the latency and bandwidth sustainable by the accessed Internal region. If the port is configured as "mesochronous", then the period is stable by programming, but the phase of arrival is still arbitrary. The ring oscillator 174 is enabled to issue a clock signal having edges thereafter, as long as an empty flag associated with the asynchronous FIFO 172 is false (e.g., the asynchronous FIFO contains data), the bus is granted, and ReqD signal is still active.

After the initial data read, the port can lose the grant at any time, completely asynchronously to any Strb signal edge. The loss of the grant shuts the ring oscillator 174 down after at most two more TStrb edges. The ReqD signal will be toggled off as soon as the ring oscillator 174 stops (again asynchronously), and then reasserted, so that the transactions on the bus can resume without extra delay as soon as the grant is restored. This toggling of the ReqD signals to the external bus occurs so that the arbiter can grant access of the bus to another requester. It should be noted that the Port remains arbitrated in favor of the Internal region until the transaction that was interrupted by loss of bus grant can complete. However, other internal regions, conmnunicating through other Ports, can use the interruption to send data to the bus, even if the same Data subfield will be used. If the port loses the grant to the external bus, the Internal region will still keep sending data and filling the output FIFO 172 until it is detected that a predetermined number of FIFO entries are left, then the Gnt signal back to the Internal Region is deasserted, and the Internal region will pause sending data until the Gnt signal is reasserted. This permits the internal region to continue to send data even when access to the bus is lost. Additional details of the ring oscillator 174 will be described below with reference to FIG. 8A. Now, an example of an external bus writing data to an internal region/circuit will be described.

As with the read operation, the GimSel signal goes active, if it isn't already, to begin the writing process and enable the Input circuitry 142 to pay attention to the bus. Simultaneously, the source that is driving the bus is given the Address grant and the data grant for the bit field the port is configured to use for the transfer, and places the address/control information and data onto the bus, followed by it's TStrb/Ren. This is coupled with the RStrb/Ten signal in FIG. 6 and the Address/Control and Data are stored into the Asynchronous input FIFO 162. In accordance with the invention, a write operation may be split so that the External bus arbiter (e.g., the Central Resource) may grant only the Address bus, if the Data Bus is transferring data between two other ports that already have started a transaction. If this occurs, the Command information is modified into an "Address Only" command, and the receiving port expects the data to be sent at a later time, with the order of address transactions to the same port preserved. This split read feature alleviates "write bubbles" that might occur when the address bus is granted to a write operation that is stalled by causing the data bus to be granted at the same time, while reads are split in time naturally. At the same time, this feature also allows scheduling for the bus to be very simple and efficient, since a write operation that can be completed in 1 clock cycle may occur.

Returning to the write operation, the upper bits of the address and the Command information are extracted out of the asynchronous FIFO 162 and sent to the input arbiter 154 (e.g., "Arbitrate ports to Internal" block) to select the appropriate internal region destination for the write command. Since that internal circuit 146 may already be accessed by another port, this arbitrate stage 154 is necessary. Assuming that there is no port already accessing the destination Internal Region, the address and first portion of the write data is selected by the input multiplexer 148, and a request signal (Req) is passed to the appropriate internal circuit/region which generates an acknowledgment signal (Ack) indicating receipt of the address/command information and data. The Ack signal is also sent back to the asynchronous FIFO 162. If the write command was a burst of N words, and N words haven't yet been sent to the Internal Region, then the Req/Ack pair will cycle until N words have been received. If the Internal region is a strictly synchronous module, then the Req signal is interpreted as an "Address/Command/Data Present" signal, valid for one clock cycle per transfer. In this case, the Clk signal is free running once started by an access, and is shut down synchronously by the core when the command is retired, or the core has determined it no longer needs the Clk to run. The free running CLW may periodically enter a metastable state especially if the empty flag of the FIFO 162 is toggling often (data is draining a little faster than as it is being supplied). This will be invisible to the Internal Region, as the metastability is confined to the Clk generator, and the Internal Region just sees an occasionally stretched Clk. The edges on the empty flag may be interpreted by the Clk logic as an "asynchronous restart" to avoid metastability in transmission of data to the Internal Region. Now, an example of the internal circuit writing to the external bus will be described.

To initiate a write operation to the external bus, the Internal region may issue a Req signal to the output arbiter 152 ("Axbitrate Internal to Ports"). The arbiter 152 issues a ReqD signal to acquire control of the data bus sub-field the Port is configured to use for the transfer, and simultaneously grants control of the port to the particular Internal Region. When the Internal Region gets the grant signal (Gnt), it issues Address/Command/Data on it's Internal data bus for output through the Output Port Asynchronous FIFO 172. The Internal Region can continue to send data until a Full flag of the FIFO 172 suppresses the Gnt signal. At some point, the port will get the External Address and Data Bus granted and the Asynchronous FIFO 172 will start outputting data and being drained of data because the ring oscillator 174 will start Strobing the Address and data. It may be the case that the bus was pre-granted, in which case, the FIFO 172 will output data immediately. The ring oscillator 174 is enabled to issue clock signal edges thereafter, as long as the FIFO Empty Flag is false, the bus is granted, and ReqD signal is still active.

After the initial data write, the port can lose the grant at any time, asynchronously to any TStrb edge. Losing the grant shuts the ring oscillator down after at most 2 more clock edges. The ReqD signal will be toggled as soon as the ring oscillator stops (again asynchronously), and then reasserted, so that the transactions on the bus can resume without extra delay as soon as the grant is restored. This toggling of the ReqD signals to the external bus arbiter occurs so that a grant may occur to another requester. It should be noted that the Port remains arbitrated in favor of the Internal region until the transaction that was interrupted by loss of bus grant can complete. However, Internal Regions, communicating through other Ports, can use the interruption to send data to the bus, even if the same Data subfield will be used. If the port loses the grant to the external bus, the Internal region will still keep sending data and filling the output FIFO 172 until it is detected that there are no FIFO entries left, then the Gnt signal back to the Internal Region is deasserted, and the Internal region will pause sending data until the Gnt signal is reasserted. Now, an example of the connection of the data strobes between different devices connected to the high speed bus in accordance with the invention will be described.

Figure 7:
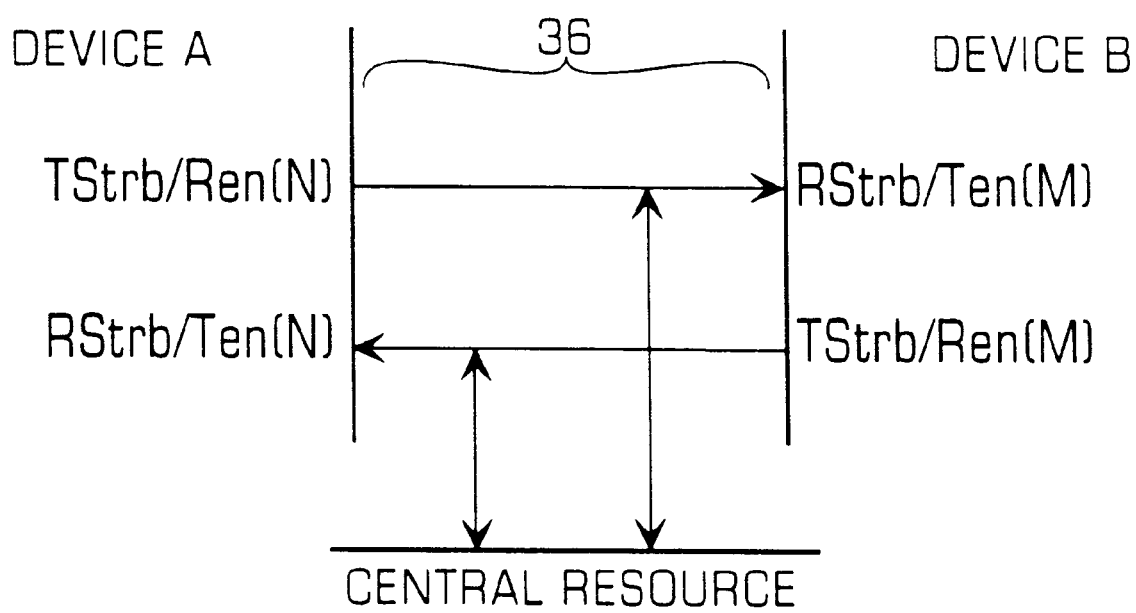
FIG. 7 is a diagram illustrating the connection of the data clocks between two ports in accordance with the invention.

FIG. 7 is a diagram illustrating a first device (Device A) and a second device (Device B) connected to each other through particular ports in a high speed bus 36 in accordance with the invention. In this example, Device A may be connected to port N1 of the high speed bus while Device B is connected to port MI. For purposes of this drawing, variables names M1 and N1 have been assigned to the ports, but these variable names have no relationship to the previously used variables M and N of the previous sections. As shown, each device may have a pair of signals which are connected to the other device at the other port. In this example, Device A generates a TStrb/Ren signal which is received by Device B as a RStrb/Ten signal. Similarly, Device A may receive a RStrb/Ten signal which is generated as a TStrb/Ren signal by Device B. Thus, each port of the high speed bus has this pair of signals connected to another port. In accordance with the invention, each port of the high speed bus is connected by a pair of clock signal in this fashion even if the two communicating ports have a physically separate bit-field subset of up to 256 bit Data bus reserved for their communication, or share the Data bus bit fields with other port pairs. A central resource 62, as described above, may sample all of the bus transfers for efficient granting of the bus. The central resource may also generate a TStrb signal and drive the address/command/data bus for purposes of configuring the high speed bus or its ports.

The TStrb/Ren output has two functions, depending on whether the port is receiving or sending data. If the port is receiving data, this output has the function "Ren" or Receive Enable, and a de-assertion of this output during a transaction stops the sending circuit until it is reasserted. If the port is sending data this output has the function "TStrb" or Transmission Strobe, and data is asserted out of the device coincident with an edge (either rising or falling) on this pin. The RStrb/Ten input has also two functions, depending on whether the port is receiving or sending data. If the port is sending data this input has the function "Ten" or Transmit Enable, and a de-assertion of this input during a transaction stops the sending circuit until it is re-asserted. If the port is receiving data this output has the function "RStrb" or Receive Strobe, and data is latched into the device coincident with an edge (either rising or falling) on this pin. This signaling method is called "Burst Mode Asynchronous 2-Phase Signaling", since it transmits data asynchronously on either edge of a strobe like standard 2-phase signaling, but does not require return signal edges on a 1 for 1 basis to operate successfully. This is a benefit in that the bus loop-time is decoupled from the transmission rate (similar to synchronous transmission), but setup and hold issues of synchronous transmission are avoided. Once again note that by dedicating one of these signal pairs per port, an extremely flexible signaling protocol is devised. Thus, port pairs can be connected together over a private point to point connection, share a high speed bus (GigaBus™) with other port pairs or, by use of the GIMSel, M1 does not need to be equal to N1. This allows a master device (e.g. a CPU or other controller) to send a TStrb to multiple wire or'd devices, and receive RStrb from multiple wire or'd devices (e.g. an array of memory die). This also substantially eases the timing and control circuit design burden for port circuitry, since a circuit that can successfully operate for a granted point to point architecture can also co-exist on an arbitrated, multi-mastering bus with many pairs of ports. At the extremely high speeds of future circuits, this will substantially decouple design of modules from larger system timing issues while not slowing down the whole system in contrast to conventional 2-phase and 4-phase asynchronous design methods. Now, an example of a bus strobe generator/ring oscillator in accordance with the invention will be described.

Figure 8A:
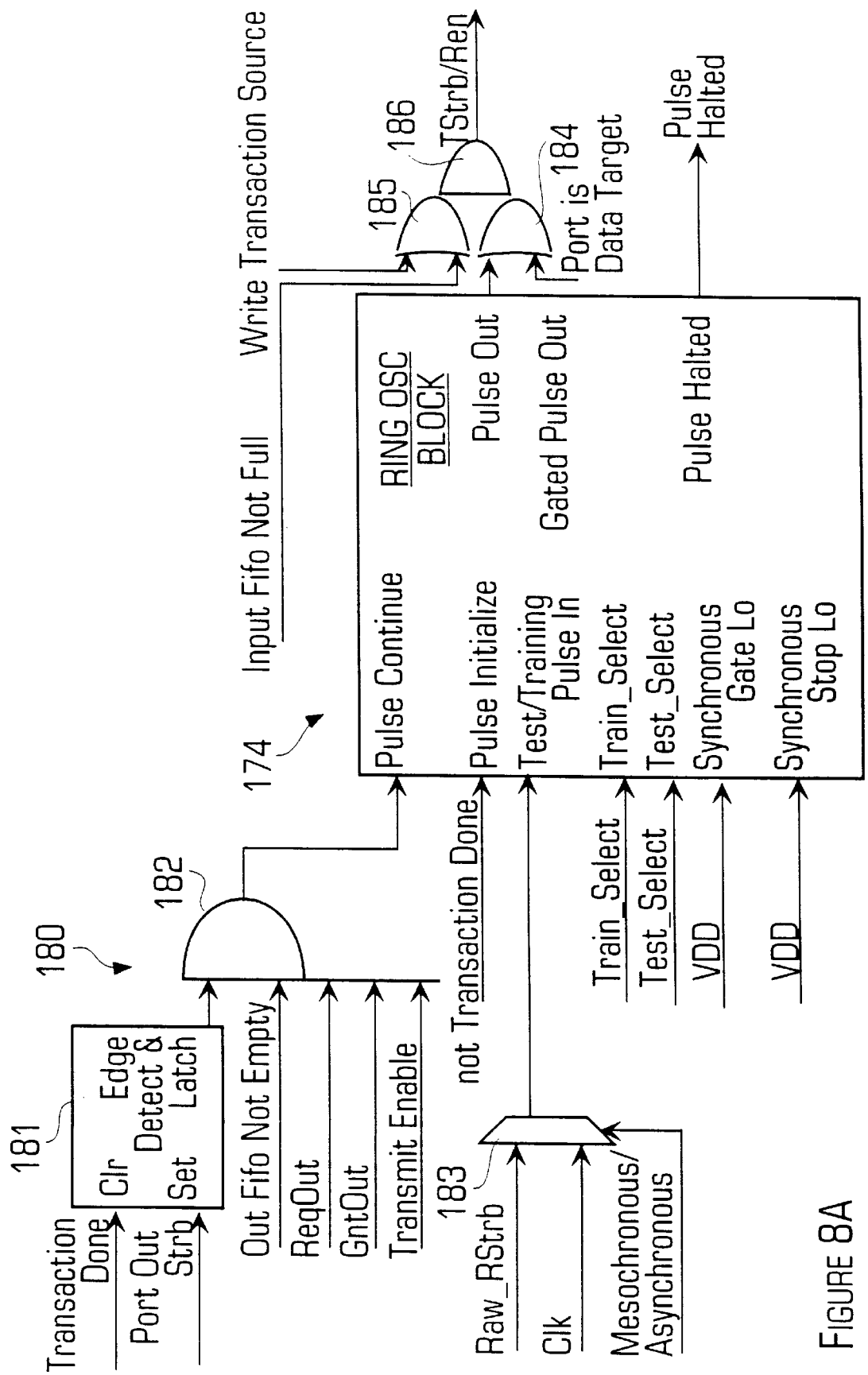
FIG. 8A is a diagram illustrating a bus strobe generation device in accordance with the invention.
Figure 8B:
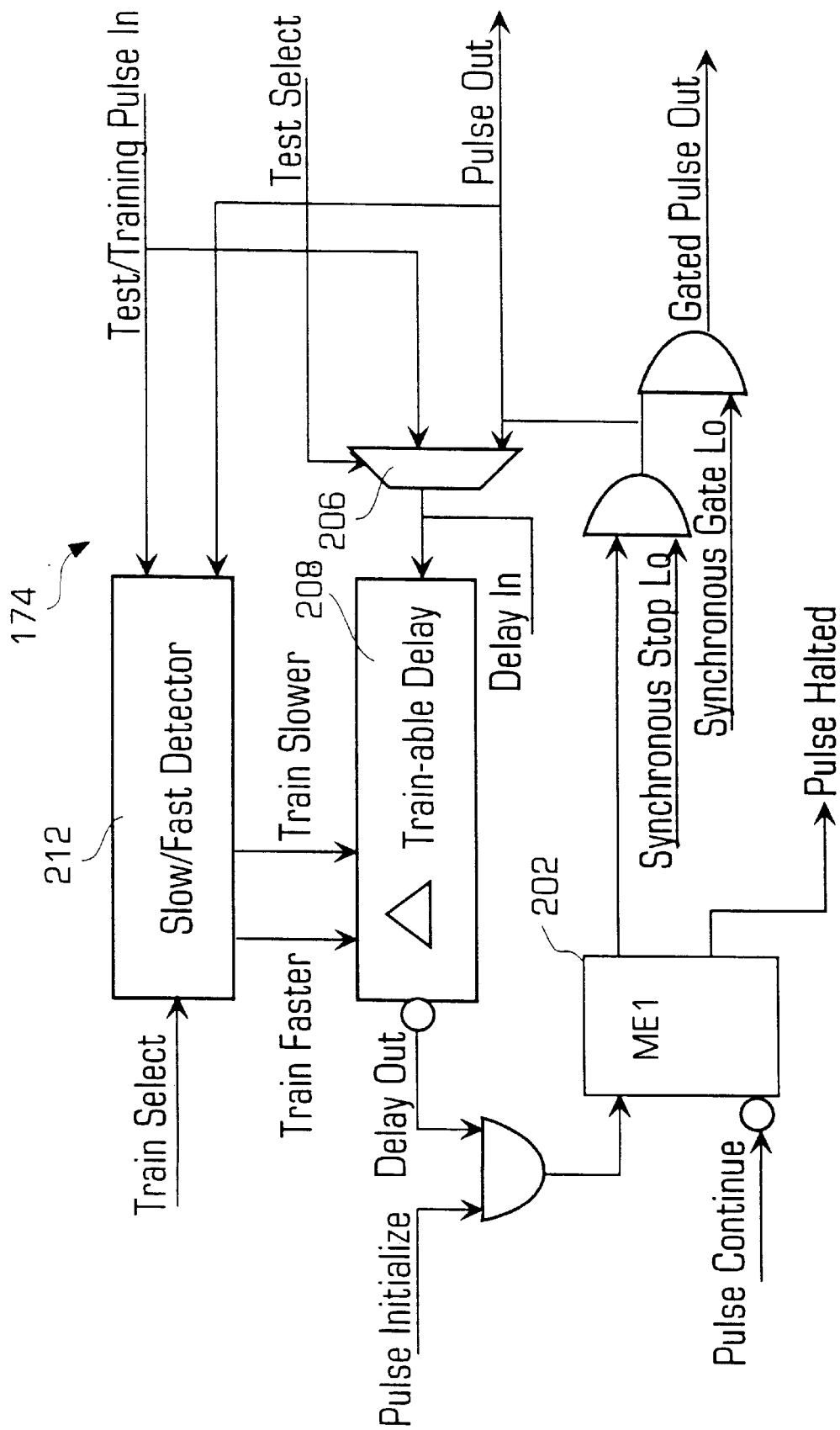
FIG. 8B is a block diagram of an example of a ring oscillator circuit in accordance with the invention.

FIGS. 8A and 8B are a device diagram and a circuit diagram, respectively, of an example of a bus strobe generator 180 with a ring oscillator 174 in accordance with the invention. As shown in FIG. 8A, the strobe generator may include the ring oscillator 174, a edge detect and latch circuit 181 and an AND gate 182 whose output is the Pulse Continue signal fed into the ring oscillator 174. A Raw_RStrb signal and a Clk signal may be fed into a multiplexer 183 which is controlled by a mesochronous/asynchronous signal (indicating either the mesochronous or the asynchronous communications mode) to output a Test/Training Pulse In signal into the ring oscillator. The Test/Training Pulse In signal is used to train the phase of the edges generated by the ring oscillator to either the RStrb signal (for asynchronous operation) or the Clk signal (for mesochronous operation). The ring oscillator may also receive a Train_Select signal, a Test_Select signal, synchronous Gate Lo and synchronous Stop Lo signals (which are tied to VDD), and a Pulse Initialize signal which does not permit the phase of the output signal from the ring oscillator (TStrb/Ren) to change if the transaction has not been completed. The strobe generator 180 may also include an OR gate 184 and OR gate 185 whose inputs are an Input FIFO not fall signal, Write Transaction Source signal (which indicates this port is writing to the bus), and Port is data target signal. These are connected to an AND gate 186 in combination with the Pulse Out signal. The output of the AND gate 186 is the TStrb/Ren signal. this circuitry allows writes to use the Pulse Out to generate TStrb, and the Input FIFO Not Full signal to generate Ren if the port is a data target from a companion port. The ring oscillator may also output a Pulse Halted signal which is described below. Use of the Ring Oscillator block in this manner allows reliable, metastable and glitch free operation while using the Req and Gnt signals to asynchronously start and stop the TStrb generation. This is a key element of the invention. As shown in FIG. 8B, the ring oscillator 174 may include various circuitry, the operation of which will now be described.

Initially, the Pulse Initialize signal is low to force the circuit into a known state with a low Pulse Out signal. The Pulse Initialize signal goes high and is fed into a first AND gate 200. The output of the AND gates 200 is connected to the inputs of a Mutual Exclusion Element (ME) 202. The ME is a circuit element that has 2 inputs and 2 outputs. Each input is passed to the corresponding output, unless both inputs are high, in which case the input that went high first "wins" and the other output stays low. In the event of simultaneous low to high transitions on the inputs, the ME goes metastable internally, but maintains both outputs low until the metastability resolves, so the rest of the circuit is protected from the metastability. The high Pulse Initialize signal causes the ME to be released (e.g., the ME may pass a high signal through, as long as Pulse Continue stays high). When the Pulse Continue signal goes high the ME passes Delay Out through, closing the ring and allowing oscillations through the Trainable Delay. This causes the Pulse Out signal to go high, and the high Pulse Out signal is fed back through a multiplexer 206 to a Train-able delay line 208. This cycle repeats with alternating phase through the delay. When Pulse Continue subsequently goes low, the Delay Out will eventually oscillate to low and allow the Pulse Halted Output to go high and block further Oscillations through the ring (since only 1 ME output can go high at a time).

When the Ring Oscillator is used in the TStrb generation, the Pulse Halted signal is used by the Req/Gnt circuitry to detect that a de-granted process has stopped or been suspended, and the new process may start. Any grants for a process to control the bus brings the Pulse Continue signal high.

The Test/Training Pulse In signal permits the frequency of the ring oscillations generated by the ring oscillator to be calibrated to a Clk signal or, in an independent speed arbitration with the companion port on the bus, to a high or lower frequency. The Test/Training Pulse In signal may also be fed into a slow/fast detector 212 which detects the frequency and phase of the Test/Training Pulse In with respect to the Pulse Out. The Test/Training Pulse In signal may be a Clk signal or a test pulse which may be used to initially determine the phase of the oscillations generated by the ring oscillator. The fast/slow detector 212 may be controlled by a Train Select signal to select the training process. The fast/slow detector 212 may compare the Test/Training Pulse In signal to the Pulse Out signal and generate a Train Faster and a Train Slower signal which indicate the relative speed of the training pulses and the Pulse Out signal. The Train Faster and Train Slower signals are fed into the Tunable delay 208 in order to change the delay in the signal and therefore the phase and frequency of the Pulse Out signal. In addition, the phase of Pulse Out signal will match the phase of the Pulse In signal when the ring oscillator has locked into the Clk frequency in a Mesochronous or a testing mode. This allows testing of the circuitry that uses Pulse Out to be reliable and Metastable free, if so desired in a particular system. This is another unique benefit with this architecture, in that traditional asynchronous circuits are very difficult to produce exactly repeatable operations for tester test vector comparison. This is also a use for the Synchronous Stop Lo and Synchronous Gate Lo inputs to the Ring Oscillator, since an exact number of Pulse Out edges can be generated without the possible metastability (and hence cycle by cycle unpredictable behavior) that using the Pulse Continue signal would entail. Now, the strobe generation when data is output from an internal region will be described.

When data is output from a particular internal region, the selected Internal Region (decided by the Internal to Port Arbitrate Block) has asserted ReqOut high and received a "Gated Port Gnt" (as opposed to GntOut in this diagram) to send data/address/command to the Output FIFO. It can send output to the FIFO using the Port Out Strb signal. The Edge Detect and Latch circuit goes high at the first rising edge of Port Out Strb signal. As soon as the Central Resource on the external bus asserts GntOut, and as long as Output FIFO Not Empty and Transmit Enable signals are asserted, then the Pulse Continue signal will be asserted, letting Pulse out signal issue signal edges to the Output FIFO and the External high speed bus. This will strobe the output into the companion port and drain an output from the Output FIFO. The Transmit Enable signal comes from the particular port's RStrb/Ten input block. The companion port (target for the output) can use it's TStrb/Ren (which is connected to this ports RStrb/Ten) to throttle the output by deasserting it's TStrb/Ren. Similarly, the GntOut can be de-asserted by the Central Resource, with the similar effect of stopping TStrb/Ren. This circuit stalls until the GntOut is reasserted, and the transaction can complete. It should be noted that the Output Async FIFO can continue being filled by the selected Internal region while the bus is degranted. This operation continues until the end of the transaction is detected (e.g., the FIFO goes empty and the Req from the selected Internal Region is withdrawn). When the transaction is completed, the Transaction Done signal will pulse, resetting the Edge Detect circuit 181 so that a new arbitration for the port can occur.

The port may also be operated in a Mesochronous mode by supplying Clk as the training pulse as opposed to the Raw_RStrb signal. After a training cycle, the frequency of the ring oscillator 174 will be the same as the Clk signal, and the phase of output TStrb/Ren signal will be locked as long as Train Select signal and Clk signal are active. If exact lock is not required, the Clk signal may be periodically strobed and the Train Select signal activated to re-lock the Frequency.

It should be noted that the only way to maintain frequency and phase lock is to run all ports at the same Clk frequency, and guarantee that the Pulse Continue arrival phase is such that the ME in the ring oscillator 174, as described above, will not go metastable. This can only happen during test of the part, since in actual system operation, the process of granting the bus can cause ME to enter metastability, throwing the phase (but not the frequency) off.

During asynchronous training, the Raw_RStrb signal from the RStrb/Ten input is used to train the frequency of the ring oscillator, and hence the minimum length of TStrb phases. This allows the target port to negotiate with the TStrb circuitry how fast it can accept data/address/commands into it's input FIFO. Thus, companion ports that can operate faster than the 600 Mhz minimum guaranteed Mesochronous rate may negotiate upward to higher frequencies. This allows several generations of GigaBus compliant devices (cores) to operate seamlessly together.

In the case of a transaction that is not a Write Transaction, continued assertion of the TStrb/Ren pin will require the Input FIFO Not Full signal to stay high. If the input FIFO does go full, the TStrb/Ren signal will be de-asserted until there is room again. Now, the arbitrate port to internal circuitry and arbitrate internal to port circuitry in accordance with the invention will be described.

Figure 9A:
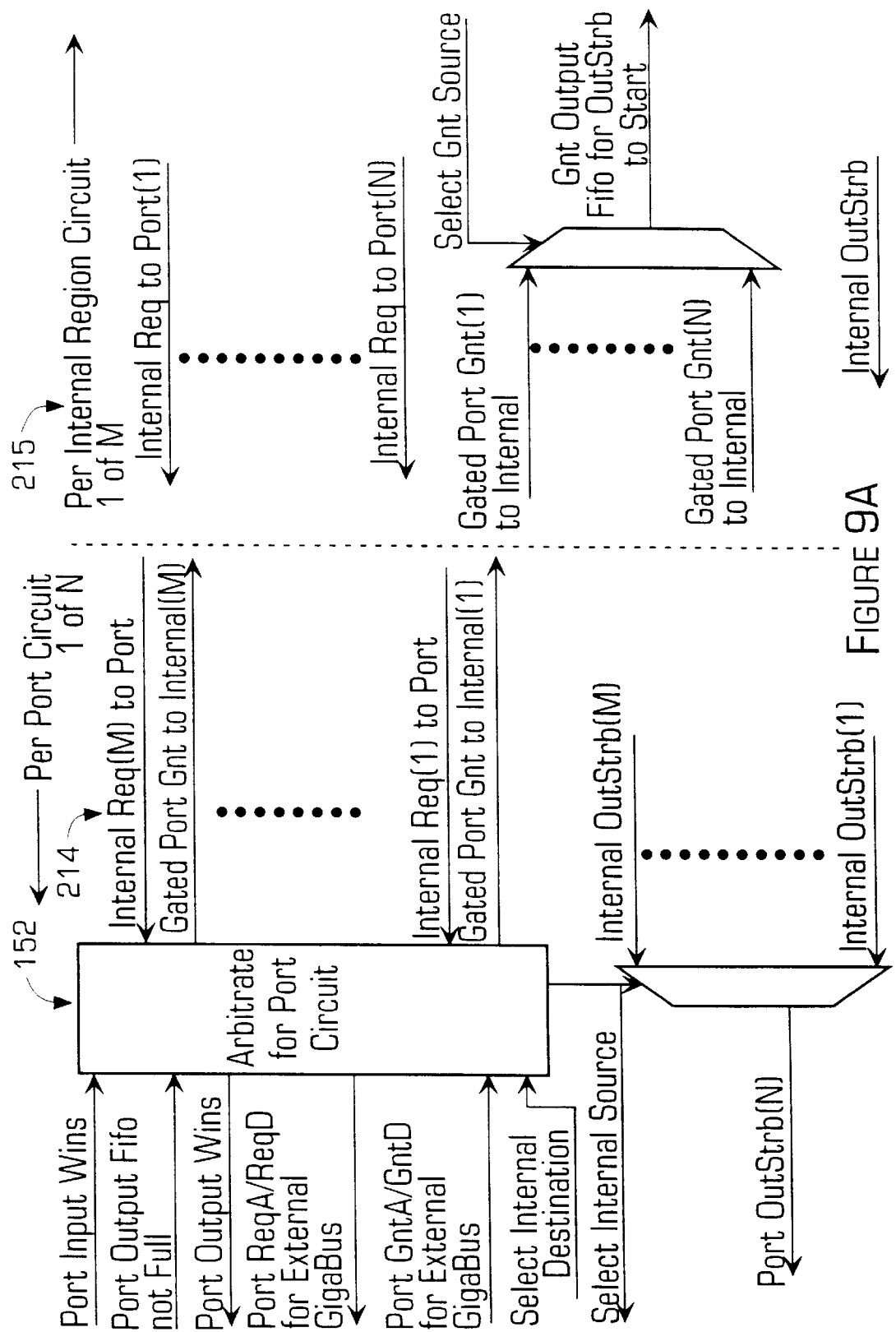
FIG. 9A is a block diagram illustrating the arbitrate internal to port circuitry in accordance with the invention.
Figure 9B:
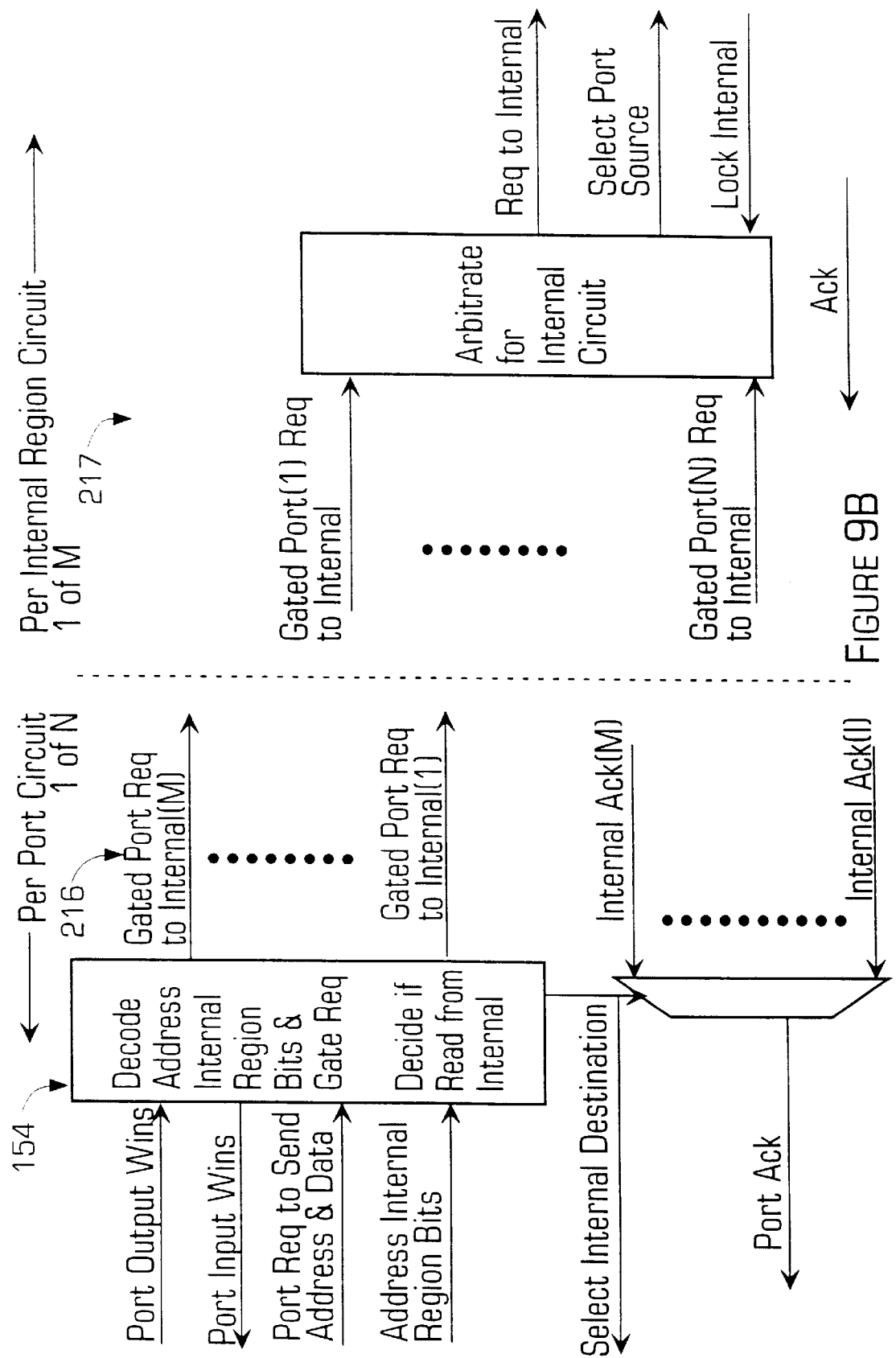
FIG. 9B is a block diagram illustrating the arbitrate ports to internal in accordance with the invention.

FIGS. 9A and 9B are block diagrams illustrating the arbitrate internal to port block 152 and the arbitrate port to internal block 154 as shown in FIG. 6, respectively. First, the arbitrate internal to ports block 152 will be described. Referring to FIG. 9A, there are two sections shown divided by a dashed line including a plurality of arbitrate circuits 214 (one for each port) and a plurality of circuits 215 (one for each Internal Region). The per port circuit 214 receives an Internal Req to the port from each of M Internal Regions. If the signal Port Input Wins is not active then the Arbitrate for Port block 152 selects a winning Req from an Internal Region and presents that Req to the GigaBus™ high speed interface for arbitration by the Central Resource, as previously described. The Port Gnt to Internal and Internal OutStrb signals of the winning Internal Region are handled as previously described. If the signal Port Input Wins is active, then the Gated Port Gnt to Internal can only be granted to the Internal Region indicated by Select Internal Destination so as to avoid deadlock situations on the bus.

The per Internal Region Circuit (1 of M) 215 has a Req signal for each per port circuit described above, issues a Req to the appropriate port based on it's own internal state, or a read request from the port Input circuit which is now trying to return data. This per Internal Region circuit 215 also selects a Gated Port Gnt signal based on which port Req it has issued. It is the responsibility of the Internal Region to not issue conflicting Req to the ports. Now, the arbitrate port to internal block will be described.

Referring to FIG. 9B, there are two sections shown divided by a dashed line including a plurality of arbitrate circuits 216 (one for each port) and a plurality of circuits 217 (one for each Internal Region). The per port circuit 216 receives address bits from the Asynchronous Input FIFO which are used to decode the destination Internal Region, either by statically examining predefined address bit fields, or by comparing it against address bits selected under program control. The result of the decode steers the Port Req to the appropriate Internal Region, as well as generating the signal "Select Internal Destination" which selects 1 of M Ack signals from the appropriate Internal Region to be the Port Ack. This process of steering only occurs if the signal Port Output Wins is not active because the Port Input Req is locked out until Port Output Wins gets de-asserted. When the selection of a target Internal region occurs, the signal Port Input Wins will force any output request to be locked out for the duration of the Input transaction. The signals Port Output Wins and Port Input Wins are arbitrated by a mutual exclusion element (ME) so that only one is active at a time, glitch free. The per Internal Region Circuit (1 of M) 217 receives all the Req signals from each instance of the per port circuit described above, and the circuit Arbitrate for Internal Circuit, selects a winning Req based on $1^{st}$ arrival, and a fair round robin selection for pending Reqs. The Req to Internal signal is coupled to the winning Req, and the signal Select Port Source is coupled to the mux 148 in FIG. 6 to select the winning ports address/data for input to the Internal Region. The signal Lock Internal is used to lock down the winning Req until it's transaction is finished, in the event that multiple cycles of the 4-phase asynchronous Req/Ack pair are required to accept all the data associated with a transaction (e.g. a burst write is occurring, with only I address transaction required to initiate it. An example of this would be writes of data bursting to an open Row, with the Internal Region (a dram bank) auto incrementing the destination address.) This Arbitrate circuit uses multiple instances of ME elements to glitch free select the winning Port, and there are several examples of this circuit in prior art, so it will not be described here. Now, the timing diagrams of various transactions which may occur over the high speed bus in accordance with the invention will be described.

FIGS. 10–15 are timing diagrams illustrating an example of various transactions that may occur over the high speed bus in accordance with the invention. In all these diagrams, although they are drawn referenced generally to the Clk for ease of understanding (this illustrates the meschronous mode operation) it should be realized from previous discussion that the same edge transition sequences will occur during asynchronous operation as well, but the edges will not be referenced in frequency to the Clk signal. Again, in both modes of operation, the phases of transitions are without any reference to phases of Clk. It should also be noted that although the Req, GIMSel and Gnt signals are drawn with approximately 1 Clk period separating them for clarity, in fact each event triggers the next event in a totally asynchronous and potentially much faster manner, such that edge sequences of these signals may happen as quickly as the loop time into and out of a pair of pads located next to each other on a die. In the diagrams, all TStrb/Ren and RStrb/Ten nomenclature is from the point of view of the TARGET of the command/address (e.g. a memory), unless otherwise indicated.

Figure 10:
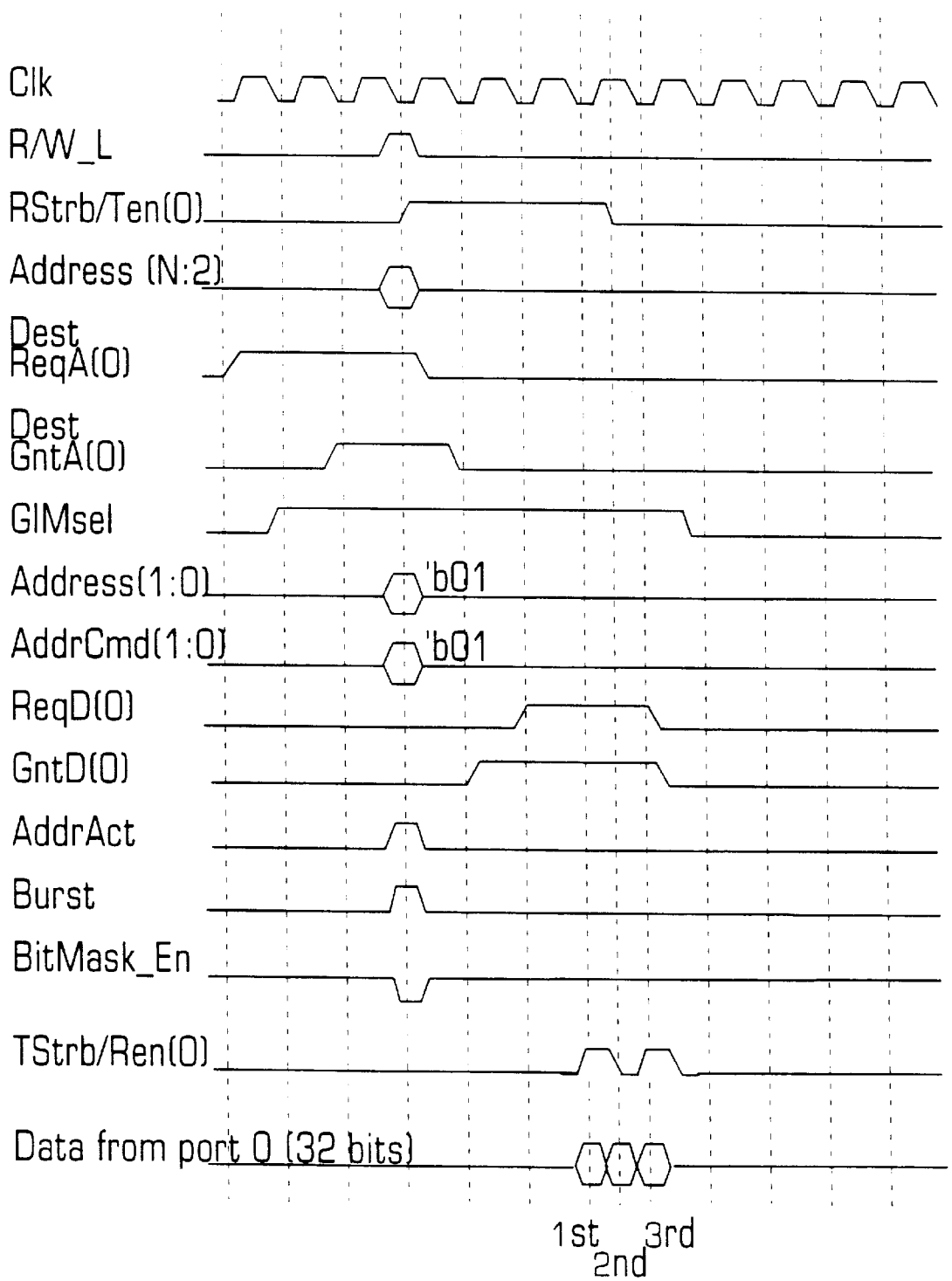
FIG. 10 is a timing diagram illustrating an example of a read transaction over the high speed bus in accordance with the invention.

FIG. 10 illustrates an example of a read transaction from a destination device by a source in which a request access to the bus signal (ReqA) is generated by the source, a chip select signal (GimSel) signal goes high to select the destination and a grant signal (GntA) is sent back to the source by the central resource. In this example, the transaction shown is to a port that has probably prefetched the requested data or to a very fast SRAM core since the data is returned in three clock cycles after the valid address is received. In this example, the request has the highest priority. Based on the state of the address group, we may note that the read is an atomic burst of three words.

Once the bus access has been granted to the source, the RStrb/Ten signal goes high, an address signal and an address command signal (AddrCmd) for the read are placed onto the bus. When the destination is prepared to have the data read, a request data signal (ReqD) go high. In this example, the resource controller knows that the data will be immediately available and it therefore pre-grants the data bus so that the read transaction may occur immediately (GntD goes high first). While these two signals are high, indicating that the bus is available to transfer the data, the TStrb/Ren signal toggles several times as the source of the request receives the data from port 0. Once the ReqD and GntD signals return to a low state, the GimSel signal drops back to a low state and the read transaction has been completed.

It should be noted that the destination master can deassert it's TStrb/Ren signals (shown in the figure as the targets RStrb/Ten) before the last piece of data is transmitted and the target may still legally expect the transaction to be completed. In the example shown, the GimSel signal is asserted before the ReqA so that the target may turn on it's input pads and enable any local clocks that are gated off for power savings when the target is not transferring data.

Figure 11:
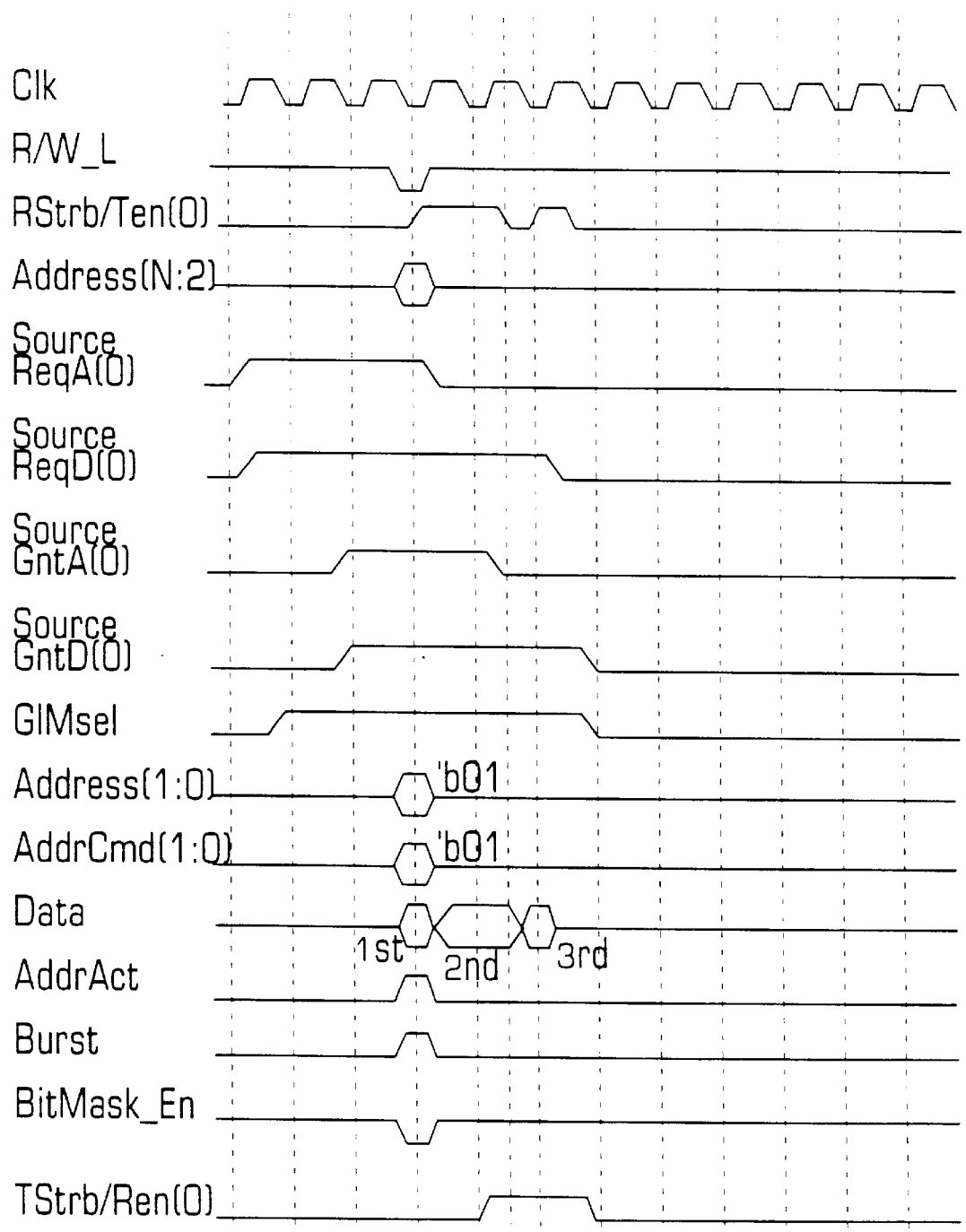
FIG. 11 is a timing diagram illustrating an example of a write transaction over the high speed bus in accordance with the invention.

In accordance with the invention, the TStrb/RStrb signal edges are slightly different for different generators of bus traffic since there is no phase locked loop and a clock signal is not routed through the bus. The bus clock TStrb is driven without any guaranteed relationship to the local Clk signal and any information about the phase relationship between the two is extracted at the receiving port. This type of port strobing permits the high speed bus in accordance with the invention to increase the Clk frequency higher than buses requiring fully synchronous traffic. None of the transactions shown in FIGS. 9–14 are synchronous with the local Clk signal and the Clk signal is shown only as a reference point. Now, write transaction which may be conducted over a high speed bus in accordance with the invention will be described. FIG. 11 is a timing diagram illustrating an example of a write transaction over the high speed bus in accordance with the invention. In this example, a basic atomic write burst of three data words is shown. In this example, data is written from a source to a destination.

Initially, the source issues a request address bus signal (ReqA) and a request data bus signal (ReqD) signals. In anticipation of the write transaction, the GimSel signal for the particular destination device is asserted so that the write transaction can be completed as soon as possible. The resource controller may then issue a grant address bus signal (GntA) and a grant data bus signal (GntD) to the source. The RStrb/Ten signal is then asserted by the source and the source device may then place an address, an address command signal (AddrCmd), and three words of data onto the granted bus. Once the address has been communicated over the bus, the ReqA signal is deasserted and therefore the GntA signal is also deasserted so that it may be granted to another device connected to the bus. Once the data has been written, the ReqD and GntD signals are deasserted so that the data bus may also be granted to another device connected to the bus. At this point, the GimSel signal is deasserted and the write transaction has been completed. In this example, the master waits until the target asserts RStrb/Ten (shown in the figure as the target's TStrb/Ren). In should also be noted that although the ReqA and ReqD signals are asserted together, as soon as the ReqA signal is released, the GntA signal is withdrawn so that the address group can be granted to another master. Now, a split read transaction which may occur over the high speed bus in accordance with the invention will be described.

Figure 12:
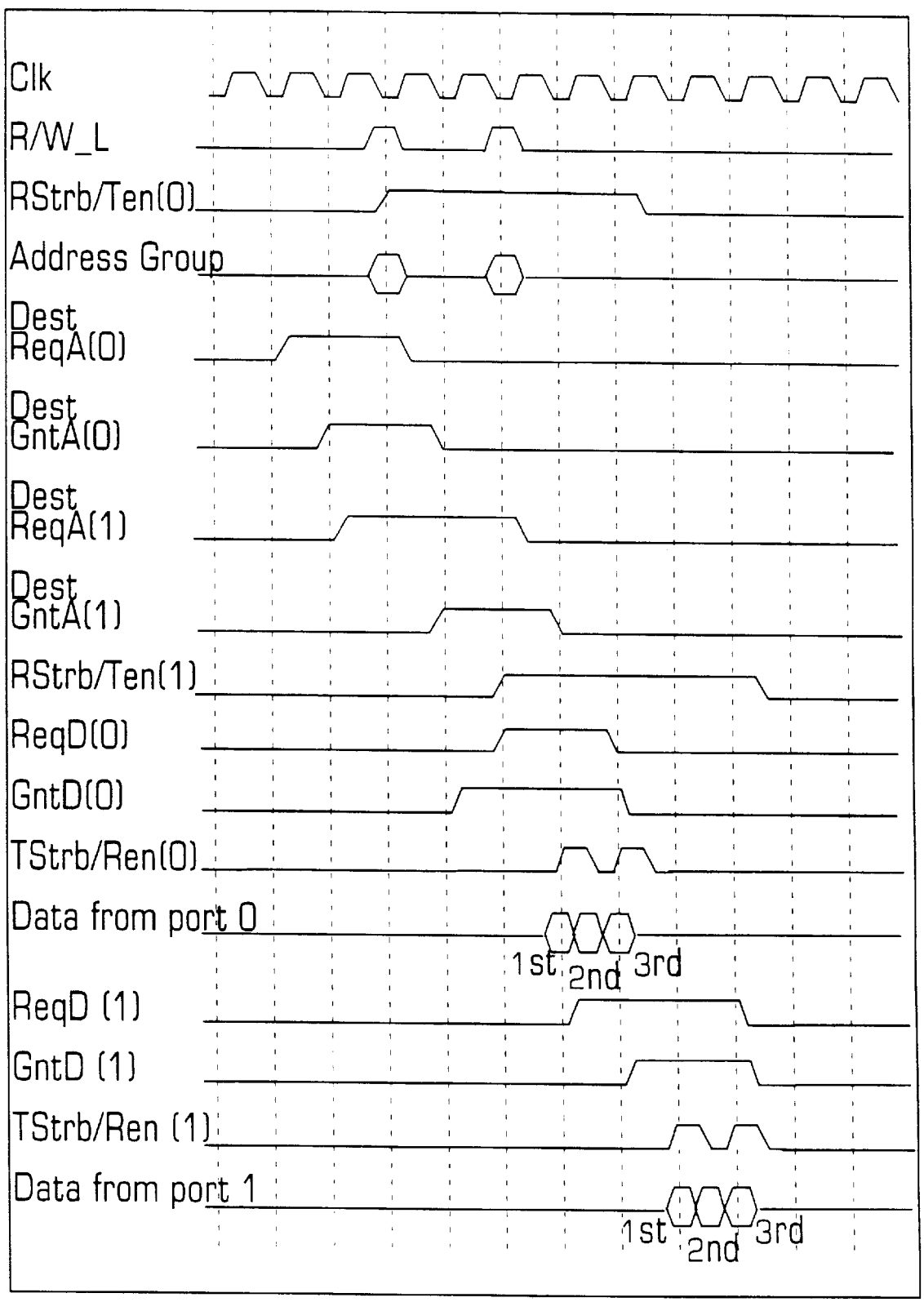
FIG. 12 is a timing diagram illustrating an example of a split read transaction over the high speed bus in accordance with the invention.

FIG. 12 is a timing diagram illustrating an example of a split read transaction over the high speed bus. In this example, a request from two different ports to the data bus on overlapping data bits is shown. In particular, two destinations read three data words from Port0 and Port1 of the bus. Initially, the Port0 destination requests access to the address bus by asserting the ReqA signal. Then Port0 is then granted the address bus (GntA). Next, the Port1 requests access to the address bus (ReqA), but is not granted the bus until the Port0 has lost the grant of the address bus. For the Port0, the address group signal communicates the address over the bus while Port0 has access to the address bus. While Port1 has access to the address bus, the address group contains the address for the Port1 read transaction. As the first address is placed onto the bus, the RStrb/Ten signal is asserted. Note that the TStrb/Ren for the 2 destinations (shown as targets RStrb/Ten in the drawings) display their dual use for read transactions. That is, the rising edge of these pins constitutes "TStrb", and communicates the Address/command. The signals stay asserted as "Ren", ready to receive the read data. For long bursts (not shown here), that filled the input FIFO's during the return of data, these signals would be de-asserted and re-asserted as "Ren" as the FIFO alternately filled and drained, and the edges generated thereby would NOT be used to latch any data transactions on the bus.

Once the grant of the address bus to Port1 has been completed, the RStrb/Ten signal for Port1 is asserted to permit the data to be communicated. Prior to the RStrb/Ten signal assertion, the resource controller sends a GntD signal to Port0 prior to the Port0 sending a ReqD signal in order to speed up the read transaction. Once Port0 receives the GntD signal, the TStrb/Ren signal for Port0 is asserted and the data from Port0 is read onto the bus and latched at the requesting target. While the data from Port0 is being read, Port1 requests access to the data bus (ReqD[1]) which is then granted to Port1 (GntD[1]) once the read through Port0 is completed so that the data from Port1 may be read. In this manner, the split read transaction is completed. As shown, with the high speed bus in accordance with the invention, two read transactions across the bus may be processed is parallel instead of waiting for the first read transaction to be completed prior to the second read transaction being started. Now, a split read with an intervening write transaction will be described.

Figure 13:
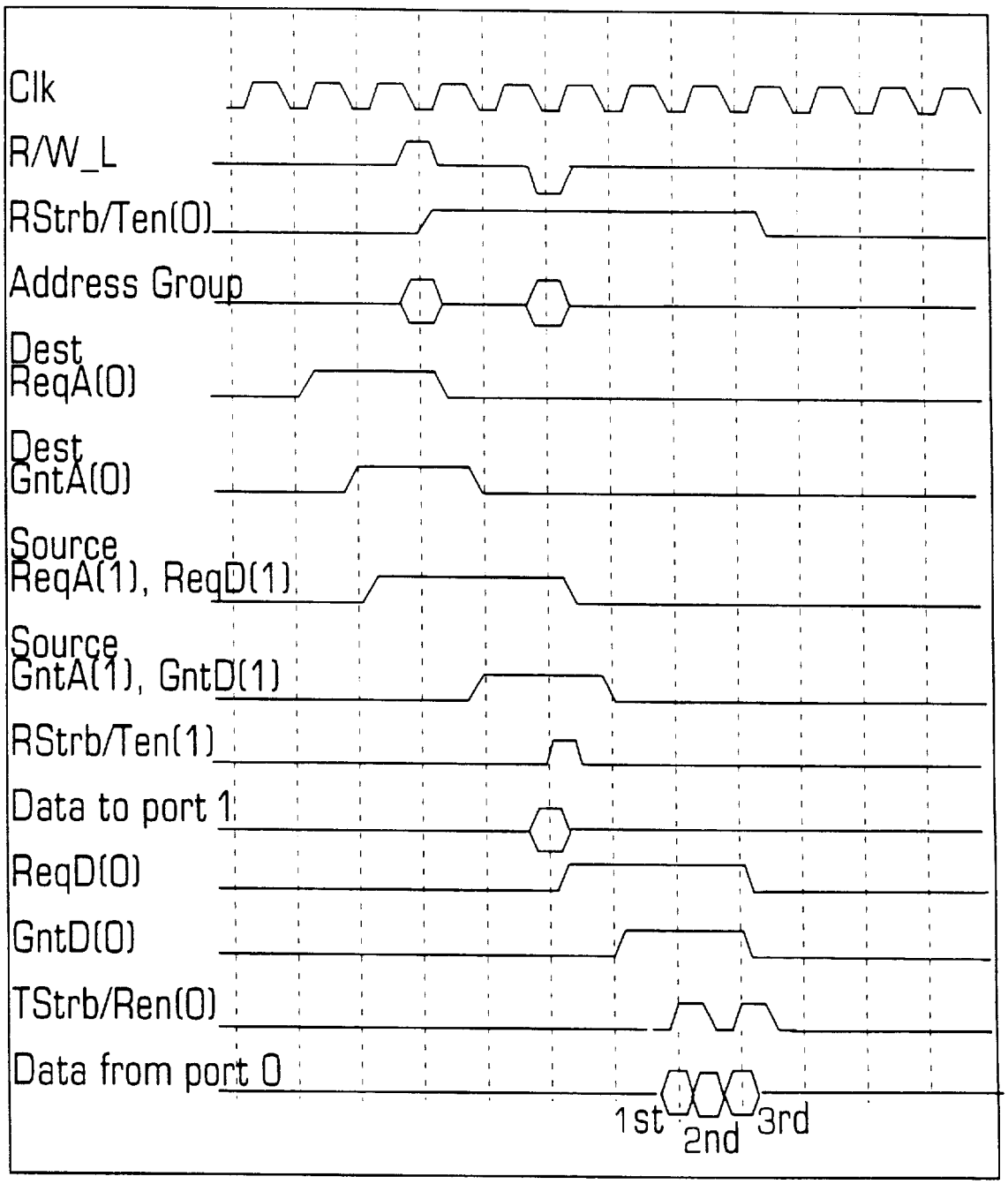
FIG. 13 is a timing diagram illustrating an example of a split read with an intervening write transaction over the high speed bus in accordance with the invention.

FIG. 13 is a timing diagram illustrating an example of a split read with an intervening write transaction over the high speed bus in accordance with the invention. In this example, three data words are read from Port0 and one data word is written to Port1. Initially, the destination of the read requests access to the address bus (ReqA[0]) and is granted the bus (GntA[0]). As soon as the address bus is granted to the destination for the read transaction, the source of the write transaction requests the address and data bus (ReqA[1], ReqD[1]). Once the address bus is granted to the destination, the RStrb/Ten signal (RStrb/Ren[0]) for the read transaction is asserted and the address group contains the address for the read transaction. Once the grant of the address bus for the read transaction is deasserted, the address and data bus are granted to the write transaction (GntA[1], GntD[1]), the RStrb/Ten signal for the write transaction over Port1 (RStrb/Ten[1]) is asserted, the address of the write transaction is contained in the address group, and the one data word is written to Port1.

Once the one word write transaction is completed, the read transaction requests access to the data bus (ReqD[0]) and the data bus is granted (GntD[0]) once the grant signal for Port1 (GntD[1]) is deasserted. Next, the TStrb/Ren signal from Port0 (TStrb/Ren[0]) is asserted and the reading of the three words from Port0 is completed. Thus, the high speed bus permits read transactions and write transactions to be processed simultaneously. As shown, the write transaction acquires the bus and competes for a different port pair that the read transaction is occurring on, even though the transactions occupy the same data bus fields. An anticipatory grant of the ReqD for the read transaction does not occur in this example because the port desiring to write the data asserts it's ReqA signal first. Now, an example of a simultaneous read transaction from separate bit fields will be described.

Figure 14:
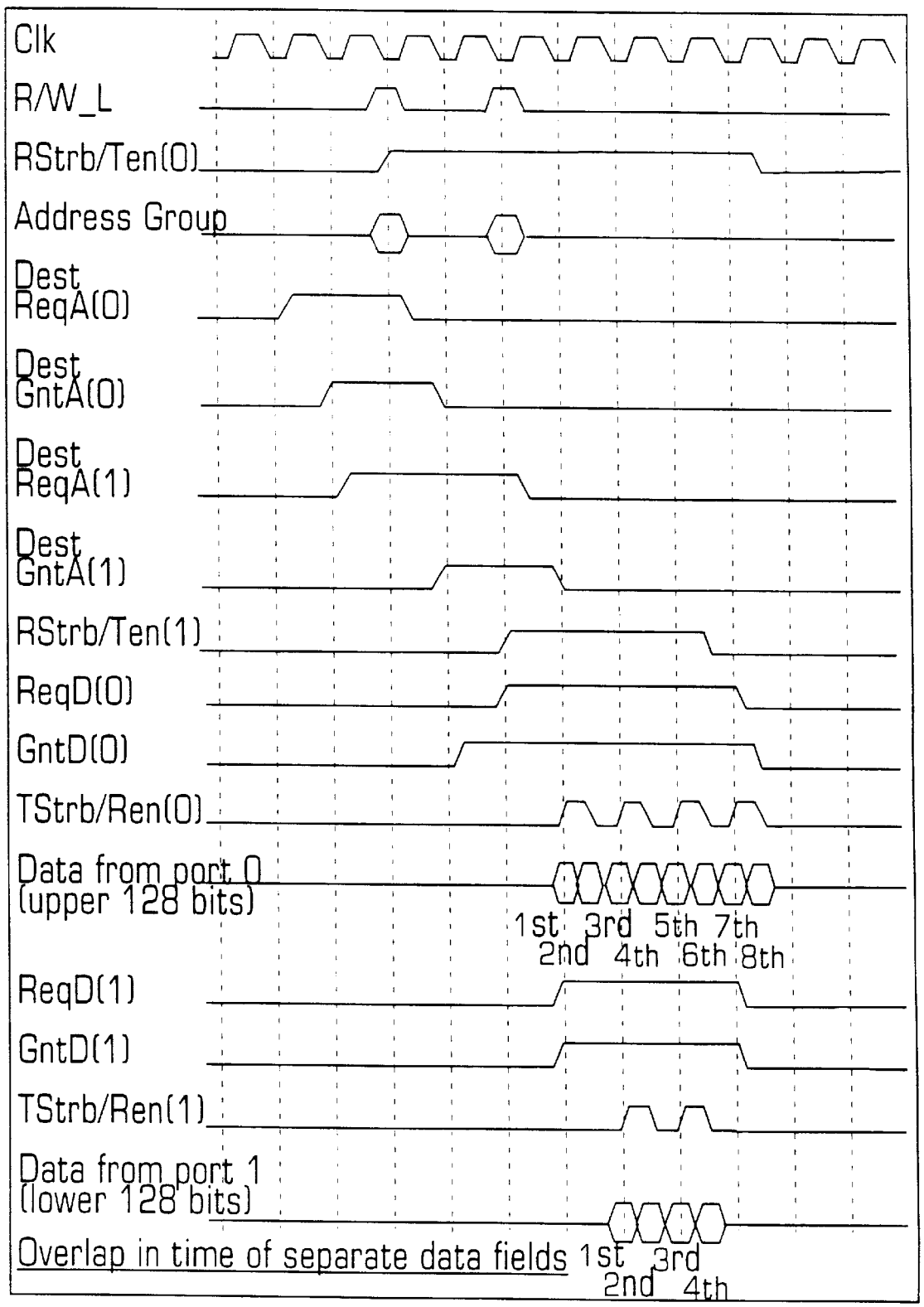
FIG. 14 is a timing diagram illustrating an example of a simultaneous read transactions from separate bit field over the high speed bus in accordance with the invention.

FIG. 14 is a timing diagram illustrating an example of a simultaneous read transactions from separate bit field over the high speed bus in accordance with the invention. In particular, the overlap of data transaction using different bit fields is shown. This example shows the case of a 256-bit wide Data bus, split into 2 128-bit Data sub-buses, which are both controlled by a common address bus. If these two 128-bit ports are both communicating with the same memory core, then an effective means for creating a dual ported memory is thus obtained. This feature of being able to configure a high speed bus memory (Gigabus™) as either single, dual or multi-ported by programming the port widths and used data bits is a unique and very valuable feature of this bus architecture. It should be noted that although this example pertains to a very wide memory, the exact same considerations apply to a memory that is only 32 bits wide. That is, it could be split into 2 16-bit ports in the manner described.

In this example, the read transfer of four Gwords from Port0 and 2 Gwords from Port1 will be described. A "GWord" is a 256 bit datum, or 8×32 data words. First, destination device on Port0 requests the address bus (ReqA [0]). Next, the Port0 device is granted the address bus (GntA[0]) and the Port1 device requests access to the bus (ReqA[1]). Once Port0 has been granted access to the address bus, the RStrb/Ten signal for Port0 (RStrb/Ten[0]) is asserted and the address group contains the address within Port0 from which the data is going to be read. Once the bus is withdrawn from Port0, Port 1 is granted the address bus (GntA[1]), The RStrb/Ten signal for Port1 (RStrb/Ten[1]) is asserted, and the address group contains the address from which the data in Port1 is being read. At the same time that Port1 requests sending the address data, Port0 is pregranted access to the data bus (GntD[0]), the TStrb/Ren[0] signal is toggled and the data from Port0 may be read from the destination over the upper 128 bits of the bus. Once Port1 has sent the address data, it also requests access to and is granted access to the data bus (ReqD[1], GntD[1]), the TStrb/Ren[1] signal is toggled and the data is read from Port1 over the lower 128 bits of the bus. In this manner, two read transactions may overlap with each other and occur simultaneously because the two read transactions are using different parts of the bit fields on the data bus. Now, an example of a pregranted read transaction for a cache memory connected to the high speed bus will be described.

Figure 15:
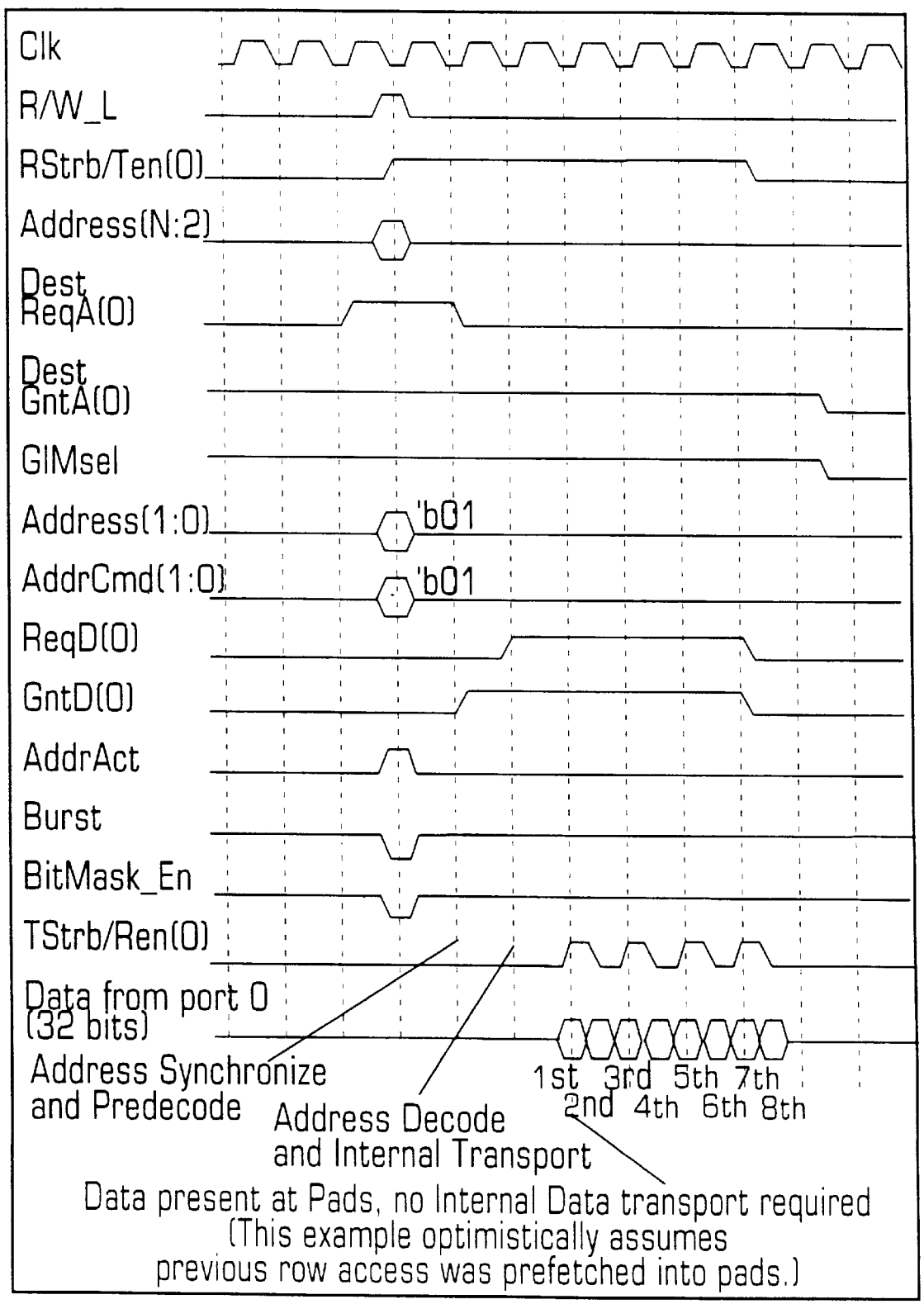
FIG. 15 is a timing diagram illustrating an example of a pregranted read transaction for a cache memory over the high speed bus in accordance with the invention.

FIG. 15 is a timing diagram illustrating an example of a pregranted read transaction for a cache memory connected to the high speed bus in accordance with the invention. In particular, the minimum access time read on a pregranted bus is shown wherein the access time to the first word, is approximately twelve nanoseconds (nS). If the data was not prefetched into the pad registers, then the access to the first word would require an additional column access time of the DRAM core (approximately 10 nS) which would mean an initial access time of about twenty-three nS. A row miss would add an additional row access time of about twenty-five nS for a total access time of about thirty-seven and a half nanoseconds. This specific example is intended to show the utility of using a return by request mechanism combined with a private return strobe. In this case, 3 different potential latencies to the data are described, but the circuit would work reliably in all cases, with only the delay imposed by the different core latencies as the difference in signaling on the bus. This is a much simpler architecture than competing packetized buses, which could not accommodate this uncertainty on when data would be returned. Now, a high speed bus compatible dynamic random access memory device (GDRam) in accordance with the invention will be described.

Figure 16:
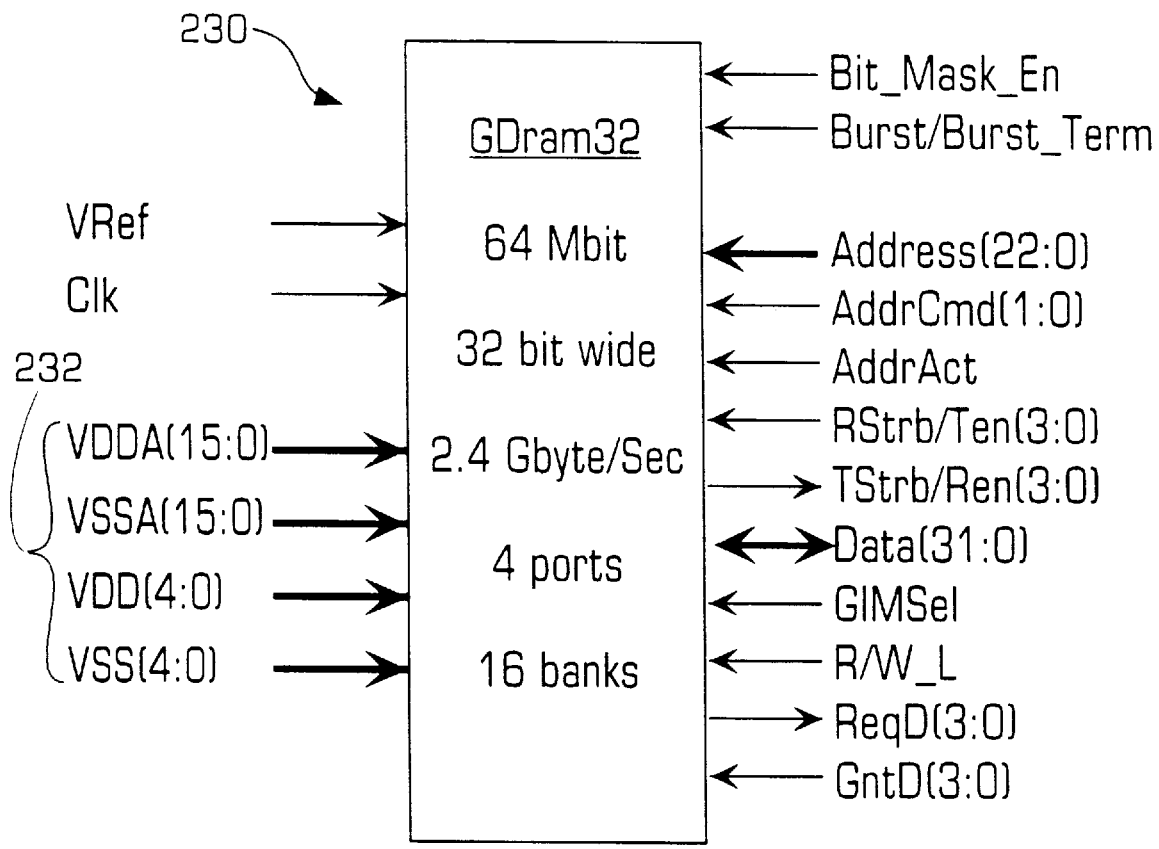
FIG. 16 is a diagram illustrating a GDRam device in accordance with the invention.

FIG. 16 is a diagram illustrating a GDRam device in accordance with the invention. As shown in FIG. 16, a GDRam device 230 in accordance with the invention may receive one or more ground and supply voltage signals 232, a VRef signal 234 and a clock signal (Clk). The GDRam may store 64 Mbits of data and may be 64-bits wide. The GDRam may have a transfer speed of about 4.8 Gbytes/second. The GDRam 230 may also receive various signals from the high speed bus, such as Bit_Mask_En, Burst/Burst_Term, Address, AddrCmd, AddrAct, RStrb/Ten, GimSel, R/W_L and GntD. The GDRam may generate various signals output to the high speed bus, such as 64-bit wide Data, TStrb/Ren and ReqD. More details of the GDRam in accordance with the invention will now be described with reference to FIG. 17.

Figure 17:
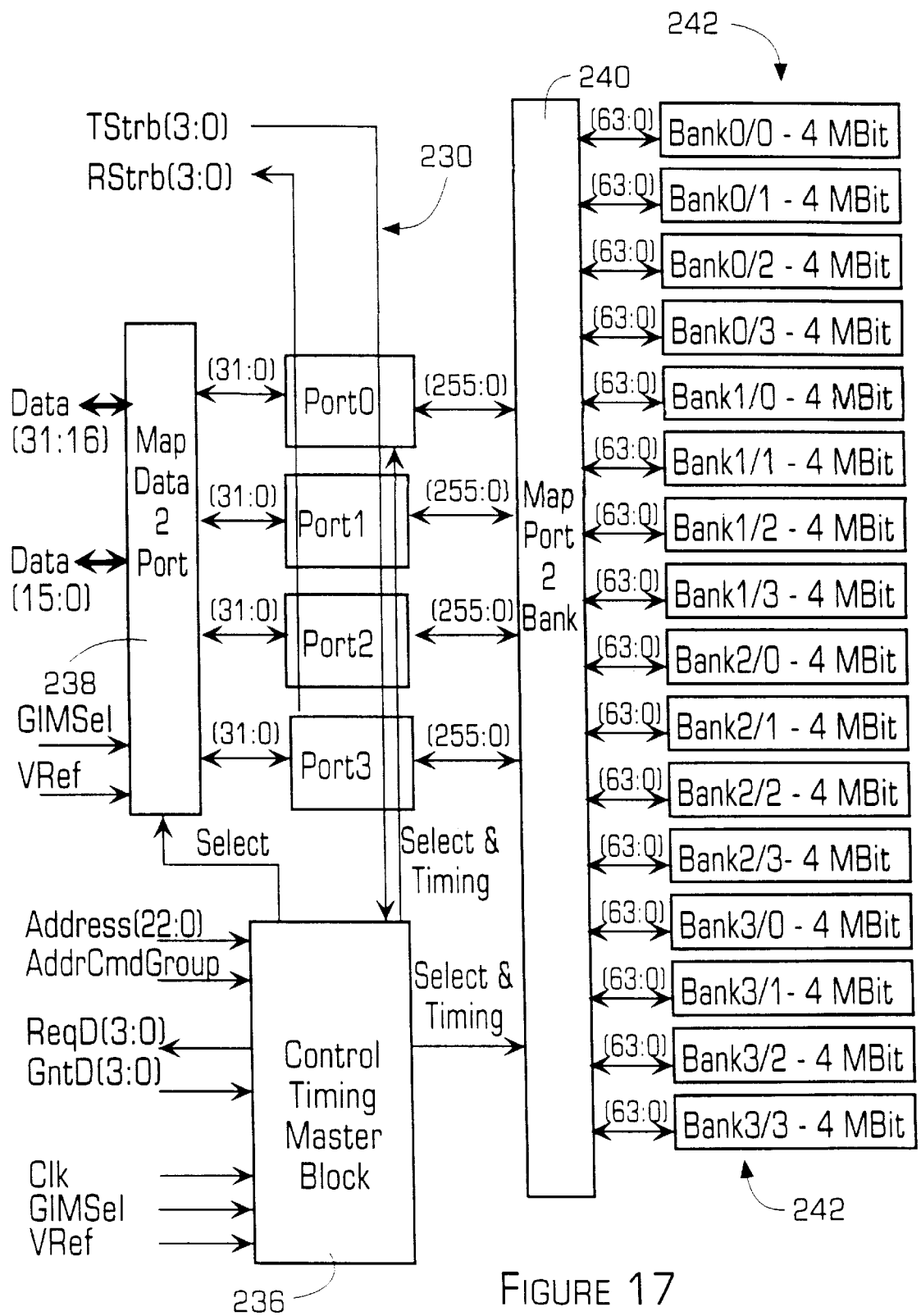
FIG. 17 is a diagram illustrating more details of the GDRam device shown in FIG. 16.

FIG. 17 is a block diagram of an example of the GDRam 230 with programmable banks in accordance with the invention. The GDRam may include a control and timing master block 236, a map data to port controller 238, a Port0, a Port1, a Port2 and a Port3, a map port to bank device 240, and a plurality of memory banks 242. This diagram is drawn at a very high level for purposes of clearly explaining the invention of providing a programmable interface which let's the user configure the bank organization and number of banks independently accessible from outside the device. However, it will be appreciated by those skilled in the art that there are many different organizations in terms of size of bank, number of banks and organization of the internal buses, and this new technique applies to all such possible structures.

All commodity DRAMs exhibit a repetitious structure (e.g. "sub-banks"), the full granularity of which is not made accessible to the user due to constraints of layout and process economics. However, in previous commodity memories there is usually at least 2 levels of substructure (banks) which are hidden from the user by convention, or to make the testing of the die marginally easier. Thus, the existing memory interface protocols force more sub-rows to be opened since gating information about what the user is interested in is not available to the core. Conversely, it is possible to think about a DRAM with many banks that brings all the potential bandwidth from a row access to a bank all the way to the interface, for every bank, in a predetermined manner. This is a style that higher bandwidth memories like Rambus Direct Ram employs, however it implies extra power and wiring in the core that not all users will need. This is wasteful in the other extreme. A scheme such as will be described below for flexibly trading off peak bandwidth at the interface against lower power and more banks is an ideal solution, which consumes almost no overhead in die area.

Referring to FIG. 17, the Banks are numbered in a way which will make the programmable number of banks utility apparent. Assume that the Data Interface can send or receive X bandwidth through all 32 bits. Since the external data bus is a low swing interface, it can be much faster per bit lane than full swing internal connections, and typically the Data bus for very high speed interfaces is de-multiplexed by a 4 to 1 or 8 to 1 factor, which gives rise to the 256-bit intermediate buses between the Ports and the Map Port 2 Bank circuit 240. Therefore, there is X bandwidth available on each of those 256 intermediate buses. If the 4 MBit Banks can supply the same bandwidth per bit lane as the intermediate buses, then each Bank can supply X*256/64 or ¼ X bandwidth. So, the core could supply full bandwidth to the interface if it was organized as 4 Banks as observed by the exterior of the Dram. For example, if Bank 0/0, Bank 0/1, Bank 0/2 and Bank 0/3 are grouped together into Bank0 (as accessed by the exterior high speed bus), then there can be 4 full bandwidth banks. This organization would follow previous commodity prior art in bank organization (e.g. JEDEC SDRAM standards for 64 M generations.)

However, if the same core was programmed by way of a bank number programming register (as suggested by the invention) to be 16 banks, then the access to the first 2*32 bit data would have the same latency, but the peak bandwidth would be ¼ X. For many users, this could be enough bandwidth while maintaining latency to the $1^{st}$ data requested and saving approximately ¾ of the row opening power for "random" DRAM traffic (such as occurs in "main memory" behind accesses to an L2 cache). The ¾ factor comes from the approximation that most of the power consumed in a DRAM comes from charging and discharging the bit line capacitance during opening a row, and then precharging again. This organization is just one example, and it will be apparent to those skilled in the art that this technique can be applied to many internal organizations which are both finer or coarser in the number of banks, and the invention is not limited to a particular organization to gain the full benefits.

Referring again to FIG. 17, notice that the Data Bus is shown as 2 sub-buses labeled Data[31:16] and Data[15:0]. This shows the ability to use the architecture of the invention to split the data bus into sub-buses that could be assigned to different ports. For example, Data[31:16] could be assigned to Port0 and Port1, while Data[15:0] could be assigned to Port2 and Port3 by the Map Data 2 Port circuitry 238. This implies that each port has access to X/2 bandwidth, which can be independently streaming at the same time. Dividing the bus into independent units like this, can be more efficient than round robin granting to competing masters, especially if long bursts of data are required by both. Note that with more banks, this arrangement is less likely to produce collisions between requesting ports than less banks, making this arrangement very close to the ideal behavior of a dual ported memory. Also note that the most granular bank arrangement of 4 banks would actually waste internal bandwidth since each of the 4 banks could supply X bandwidth, which could only be consumed by the narrower port at X/2 rate. So in this case, it might be optimal to organize the core as 8 banks (e.g. Bank 0/0 & Bank0/1 are grouped to form externally accessible Bank0, and Bank0/2 & Bank0/3 would be Bank1, Bank1/0 & Bank1/1 would be grouped to form Bank2, etc.).

To summarize, a Register may be provided to select the number of banks in combination with a Port width configuration. The Register can be a very powerful and flexible circuit to tailor a DRAM precisely to the needs of a particular system at a particular point of time of operation.

To further the low power aspects of this invention, a circuit to selectively disable the refreshing of rows in DRAMs with interfaces compliant with the high speed bus (GDRam) is now discussed. This aspect of the invention also increases the efficiency of the accesses to the DRAM core by reducing or eliminating contention for the banks by the refresh activity because the refresh circuitry may be activated at particular times only to save useful data.

To accomplish this selective disabling of the refresh capability of the DRAM, a register is defined in which a pre-assigned block or group of rows is associated with each bit in the register. If the bit in the register is cleared, the rows in that block are skipped by the refresh circuitry, avoiding the power consumption to sense the row, write it back and restore the pre-charged level of the bus. If the associated bit is set, then the refresh is performed on the rows of that block according to the usual schedule. A conventional system for disabling the refresh defines the non-refreshed area based on a maximum address, which is much less flexible, and doesn't address the way memory is allocated by modern software in combination with MMU mapping in modem CPU's. In accordance with the invention, the refresh of the DRAM core is OFF when the DRAM comes out of a power up state (i.e., is first powered up) so that unused memory never consumes unnecessary power (i.e., the register bits are all cleared). A default facility to automatically turn on the refresh capability when an area is written into the DRAM is included for systems where the software is not aware of the register.

There are many implementations of the detailed gate level control circuitry for this selective disabling of the refresh capability invention which will be immediately apparent to those skilled in the art. This selective disabling of the refresh circuitry is universally appropriate regardless of the detailed implementation forced by the design of the refresh and address decoder circuitry of a particular DRAM core circuit, and will consume very few gates. The implementation of the selective refresh disable circuitry may be as little as one AND logic gate and one register bit per block with logic to allow writes to the register. The selective refresh disabling circuitry may be located in the hierarchy of decoding of the DRAM that decides that block is ready for refreshing.

Attached to this document is Appendix A containing the various specifications for the high speed bus described above. This appendix is hereby incorporated by reference.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A high speed interconnect system which permits the high speed operation of the bus without a free running clock and synchronization circuit to resynchronize local clocks to the data transmission between a data source and a data destination, the system comprising:

a transmit strobe signal output drive circuit located in the data source connected to the bus, the transmit strobe signal output drive circuit comprising a generator for generating signal edges which are synchronous to transmitted command/data information from the data source;

a receive strobe input circuit located in a data destination and coupled to the transmit strobe signal output drive circuit, the input circuit comprising means for latching the transmitted command/data information from the data source based on the received signal edges;

wherein each data destination and each data source comprises means for communicating a bus grant signal and a bus request signal across a signal lines connecting each data source and each data destination to an arbitration circuit to obtain control of the bus and permit multiple bus request and grant signals over the bus to be active simultaneously; and means for providing simultaneous mesochronous and asynchronous signaling across a shared bus and to a common multi-ported memory.

2. The high speed interconnect system of claim 1 further comprising a ring oscillator for generating clock signals between the data source and the data destination.

3. The high speed interconnect system of claim 2, wherein said ring oscillator comprises means for protecting the high speed interconnect system from metastability by generating source synchronous strobe signals without regard to a free running clock.

4. The high speed interconnect system of claim 3, wherein said protecting means comprises a mutual exclusion element for maintaining a stable signal in the event of unstable inputs to the mutual exclusion element.

5. The high speed interconnect system of claim 2, wherein the ring oscillator further comprises means for supplying a test clock to the asynchronous interface, in such a way that it can be reliably tested at speed on a high speed tester or functionally tested on a slow speed tester to save costs, the means for supplying a test clock comprises means for breaking the ring during a test.

6. The high speed interconnect of claim 1 further comprising means for the data destination to signal that data transmission should temporarily be suspended, and means in the data source to receive said signal.

7. The high speed interconnect of claim 6 further comprising means enabling the means for temporarily suspending the data transmission to be asserted without regard to the phase relationship of the strobe signal or any system clock that is provided.

8. The high speed interconnect of claim 6 further comprising means for combining the means for indicating temporary suspension of data as the destination with the means for generating data transmission strobe edges such that signals generated by both means are signaled on the same wire, which means is active being swapped when the role of data source and destination are reversed and the current destination becomes the source in a port pair.

9. The high speed interconnect of claim 6 further comprising means for combining the means for accepting the temporary suspension of data as the source with the means for receiving data strobe edges such that signals received by both means are signaled on the same wire, which means is active being swapped when the role of data source and destination are reversed and the current destination becomes the source in a port pair.

10. The high speed interconnect system of claim 1 further comprising a dynamic random access memory compatible with said high speed interconnect system wherein said dynamic random access memory comprises a plurality of memory banks and means for selecting one or more of the memory banks of the memory in order to permit memory banks to be ganged together to achieve higher peak bandwidth.

11. The high speed interconnect of claim 10, wherein said memory further comprises means a programmable register means for reconfiguring the number of banks in the memory.

12. The high speed interconnect system of claim 10, wherein said memory further comprises a plurality of memory rows and means for selectively refreshing one or more rows of the memory.

13. The high speed interconnect system of claim 12, wherein said selective refresh means comprises a register having a plurality of bits wherein each bit in the register is assigned to a predetermined row of the memory so that rows in the memory are selectively refreshed based on the bits of the register.

14. The high speed interconnect system of claim 12, wherein said memory further comprises a data source port of the high speed interconnect system so that the memory control is split between the memory and the data destination by means of a request/grant group and strobe/throttle group.

15. The high speed interconnect system of claim 14, wherein the memory further comprises means for executing multiple asynchronous reads or writes into the memory.

16. The system of claim 15, wherein the memory further comprises means for responding to a request for data immediately when the data is available, without synchronization to a clock.

17. The high speed interconnect system of claim 1 further comprising an asynchronous interface between the high speed interconnect and core circuitry behind the interface, wherein the high speed interconnect and the core circuitry are both operated synchronously or source synchronously, the asynchronous interface circuitry supplying clock strobe signals to both the interconnect system and the core circuitry, said clock strobe signals being without any phase or frequency relationship to each other.

18. The high speed interconnect system of claim 17, wherein the bus grant signal for a port participates in starting and stopping the synchronous strobe without regard for phase relationship.

\* \* \* \* \*